(12) United States Patent
Kitamura et al.

(10) Patent No.: US 11,807,312 B2
(45) Date of Patent: Nov. 7, 2023

(54) POWER STEERING DEVICE

(71) Applicant: HITACHI AUTOMOTIVE SYSTEMS, LTD., Hitachinaka (JP)

(72) Inventors: Keisuke Kitamura, Atsugi (JP); Kohtaro Shiino, Isehara (JP); Osamu Yoshida, Yokohama (JP); Tatsuyoshi Maruyama, Atsugi (JP); Norihiro Kimura, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 782 days.

(21) Appl. No.: 16/960,345

(22) PCT Filed: Dec. 11, 2018

(86) PCT No.: PCT/JP2018/045393
§ 371 (c)(1),
(2) Date: Jul. 7, 2020

(87) PCT Pub. No.: WO2019/138757
PCT Pub. Date: Jul. 18, 2019

(65) Prior Publication Data
US 2020/0369314 A1    Nov. 26, 2020

(30) Foreign Application Priority Data
Jan. 11, 2018  (JP) .................................. 2018-002274

(51) Int. Cl.
*B62D 5/04*      (2006.01)
*F16H 25/22*    (2006.01)

(52) U.S. Cl.
CPC ....... *B62D 5/0448* (2013.01); *F16H 25/2214* (2013.01)

(58) Field of Classification Search
CPC .. B62D 5/0448; B62D 5/0424; F16H 25/2214
See application file for complete search history.

(56) References Cited

U.S. PATENT DOCUMENTS 8,925,938 B2 * 1/2015 Yamanaka ........... B62D 5/0448
                                                    280/93.514
11,685,425 B2 * 6/2023 Enomoto ............. B62D 5/0403
                                                    180/444

(Continued)

FOREIGN PATENT DOCUMENTS

JP           2017-159862 A       9/2017

OTHER PUBLICATIONS

International Search Report issued in corresponding application No. PCT/JP2018/045393 dated Mar. 5, 2019 with English translation.

(Continued)

*Primary Examiner* — Kevin Hurley
*Assistant Examiner* — Marlon A Arce
(74) *Attorney, Agent, or Firm* — FOLEY & LARDNER LLP

(57) ABSTRACT

A spring steel-made clip (22) has an arc-shaped first inserting part forcing portion (66) and an arc-shaped second inserting part forcing portion (67) facing the first inserting part forcing portion (66), a first axial direction connecting portion (68) connecting one ends of the inserting part forcing portions (66, 67) and a second axial direction connecting portion (69) connecting the other ends of the inserting part forcing portions (66, 67). The axial direction connecting portions (68, 69) have connecting end position stoppers (75, 76) protruding from their inner edge portions (68a, 69a) toward an opening (65). The connecting end position stoppers (75, 76) elastically contact position stopper contact portions (44e, 57e) of tubes (20A, 20B), then a relative movement of the tubes (20A, 20B) in a direction in which connecting end contact surfaces (47, 60) separate from each other is stopped.

14 Claims, 11 Drawing Sheets

(56) References Cited

U.S. PATENT DOCUMENTS

| | | | | |
|---|---|---|---|---|
| 2009/0013811 A1* | 1/2009 | Hsu | ................... | F16H 25/2214 |
| | | | | 74/424.87 |
| 2016/0223058 A1 | 8/2016 | Hsieh et al. | | |
| 2017/0292591 A1* | 10/2017 | Iwasaki | ............... | F16H 25/2219 |
| 2018/0202525 A1* | 7/2018 | Moriyama | .............. | F16H 25/24 |
| 2019/0009814 A1* | 1/2019 | Ohashi | ................ | F16H 25/2204 |
| 2020/0369314 A1* | 11/2020 | Kitamura | ............. | B62D 5/0448 |

OTHER PUBLICATIONS

Written Opinion issued in corresponding application No. PCT/JP2018/045393 dated Mar. 5, 2019 with English translation.

* cited by examiner

POWER STEERING DEVICE

TECHNICAL FIELD

The present invention relates to a power steering device.

BACKGROUND ART

As a power steering device, there is known a power steering device disclosed, for instance, in the following Patent Document 1.

In the Patent Document 1, in a ball screw mechanism of the power steering device, a first circulation member and a second circulation member are provided on an outer peripheral portion of a nut that closes a rack bar with step-shaped connecting ends of these first and second circulation members being butted against or connected to each other. The first and second circulation members are fixed to the nut with screws with the first and second circulation members being covered with a fixing member having arc-shaped inserting part forcing portions from above. A ball passage is formed at the first and second circulation members across the two connecting ends of the first and second circulation members, and a plurality of balls circulate in this ball passage.

CITATION LIST

Patent Document

Patent Document 1: Japanese Unexamined Patent Application Publication No. JP2017-159862

SUMMARY OF THE INVENTION

Technical Problem

In the Patent Document 1, however, although an urging force of the fixing member of the Patent Document 1 which forces the first and second circulation members against the nut from above is strong, an urging force of the fixing member which forces the first and second circulation members from sides of the first and second circulation members is weak. Because of this, there is a possibility that positions of the two connecting ends of the first and second circulation members will be relatively shifted or get misaligned in a tangent direction of the nut. As a consequence, the balls cannot smoothly circulate in the ball passage between the pair of first and second circulation members, then there is a risk that power transmission of the ball screw mechanism will be limited.

The present invention was made in view of the above technical problem. An object of the present invention is therefore to provide a power steering device that is capable of improving the power transmission of the ball screw mechanism.

Solution to Problem

In the present invention, a connecting end position stopper of a fixing member has a shape that stops a relative position shift between a first connecting end of a first circulation member and a second connecting end of a second circulation member.

Effects of Invention

According to the present invention, it is possible to improve the power transmission of the ball screw mechanism.

EMBODIMENTS FOR CARRYING OUT THE INVENTION

Embodiments of a power steering device according to the present invention will be explained below with reference to the drawings.

Figure 1:
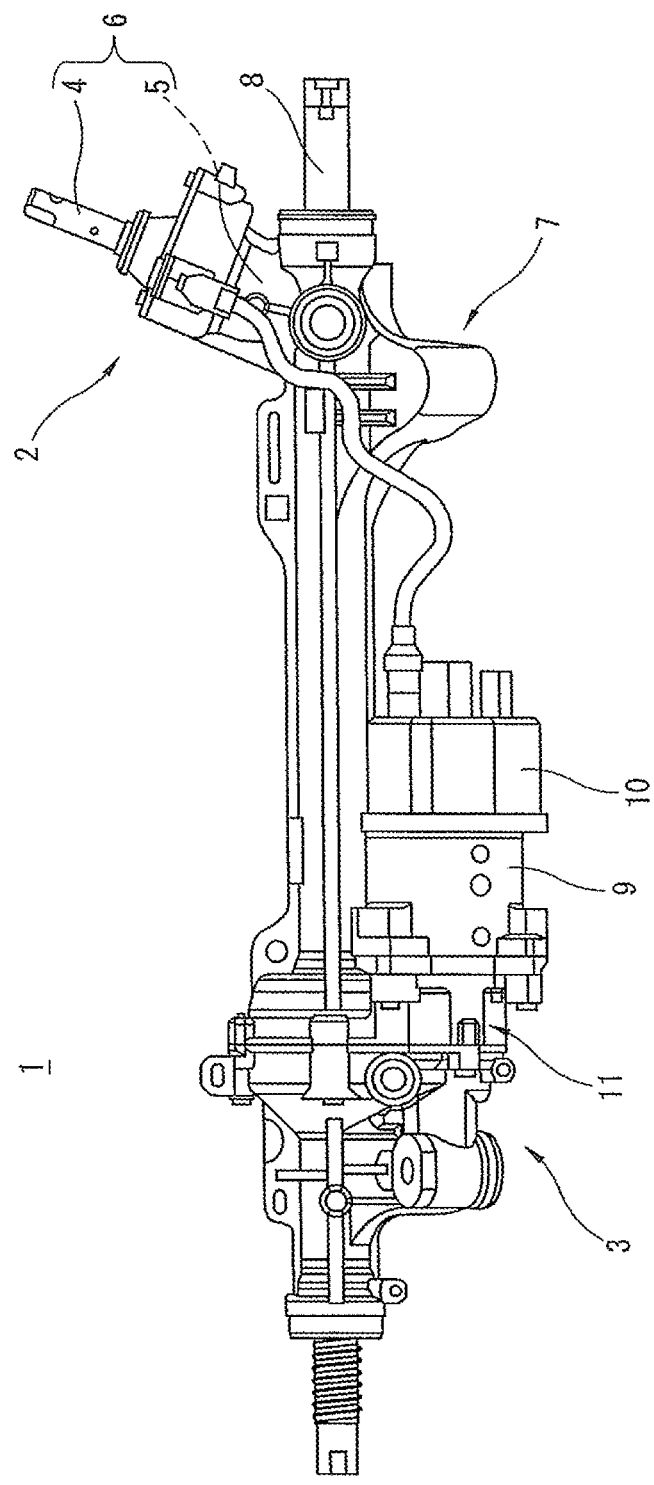
FIG. 1 is a schematic diagram of a power steering device according to a first embodiment.

First Embodiment (Configuration of Power Steering Device)
FIG. 1 is a schematic diagram of a power steering device 1 according to a first embodiment.
As shown in FIG. 1, the power steering device 1 has a steering mechanism 2 for transmitting a steering force from a driver and a steering assist mechanism 3 for assisting driver's steering operation.
The steering mechanism 2 mechanically links a steering wheel (not shown) provided in a driver's cabin of a vehicle with two front steered wheels (not shown) of the vehicle. The steering mechanism 2 has a steering shaft 6 having an input shaft 4 to which a rotation force from the steering wheel is inputted and an output shaft 5 which is connected to the input shaft 4 through a torsion bar (not shown) and a transmission mechanism 7 transmitting rotation of the steering shaft 6 to the steered wheels. The transmission mechanism 7 is configured by a rack-and-pinion mechanism (rack-and-pinion gears) having a pinion (not shown) provided at an outer periphery of the output shaft 5 and a rack (not shown) provided at an outer periphery of a rack bar 8 that is a steered shaft. Both ends of the rack bar 8 are linked to the steered wheels respectively through tie rods (not shown) and knuckle arms (not shown).

The steering assist mechanism 3 has an electric motor 9 that provides a steering force to the steering mechanism 2. This electric motor 9 is structured integrally with an electronic control unit (ECU) 10. Further, the electric motor 9 is connected to the rack bar 8 through a transmission device 11. The electric motor 9 drives and rotates an after-described nut 17, and moves the rack bar 8 in its axial direction by and according to rotation of the nut 17.

The electronic control unit 10 has functions of storing and performing various kinds of control operations, and drives and controls the electric motor 9 on the basis of a signal of a steering angle from a steering angle sensor (not shown) and a signal of a steering torque from a torque sensor (not shown).

With this configuration of the power steering device 1, when the driver performs a turning operation of the steering wheel, the input shaft 4 rotates and the torsion bar twists (torsion occurs at the torsion bar), and by an elastic force occurring by this torsion of the torsion bar, the output shaft 5 is rotated. A rotational motion of the output shaft 5 is converted into a linear motion of the rack bar 8 in the axial direction of the rack bar 8 by the rack-and-pinion mechanism. The knuckle arms (not shown) are thus pushed and pulled through the tie rods in a vehicle width direction, then a direction of the steered wheels is changed to a steering direction.

Figure 2:
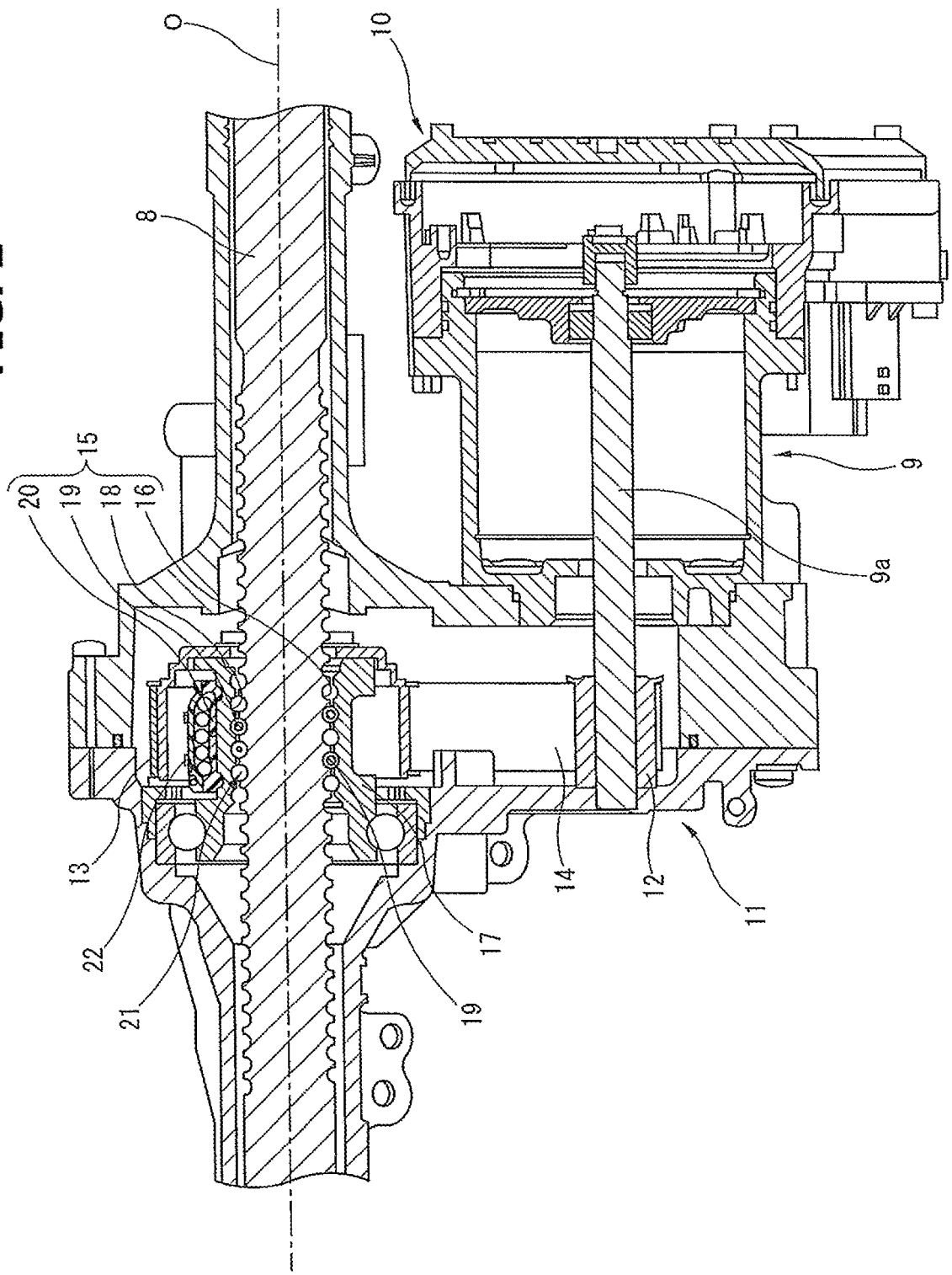
FIG. 2 is an enlarged sectional view of a motor and a transmission device shown in FIG. 1.
Figure 3:
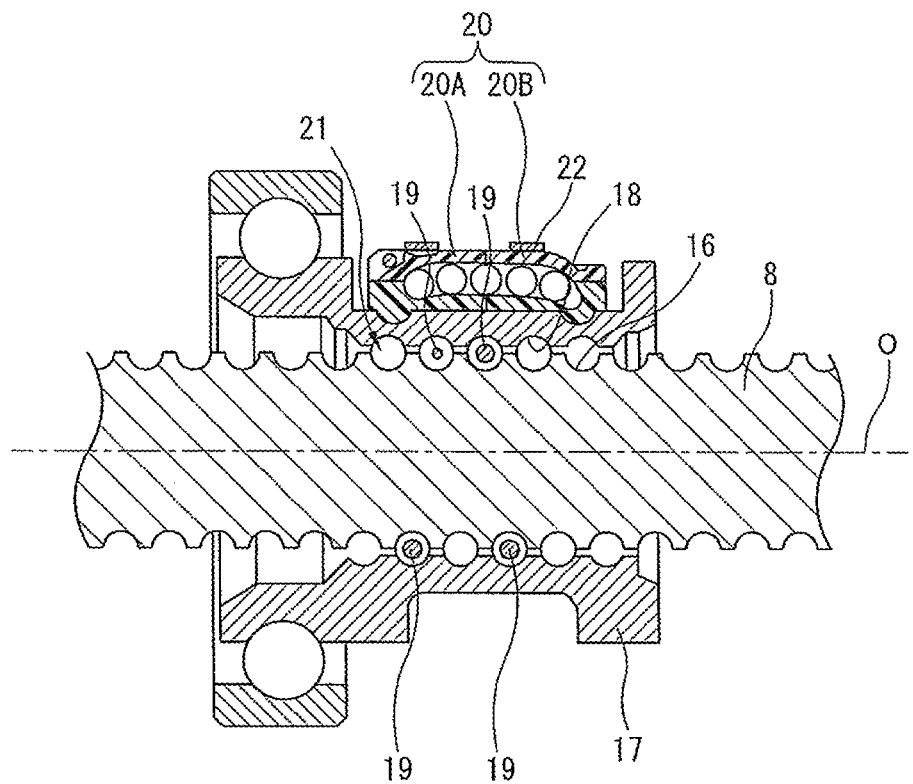
FIG. 3 is an enlarged local sectional view of the transmission device shown in FIG. 2.

FIG. 2 is an enlarged local sectional view of the power steering device 1 including the electric motor 9 and the transmission device 11. FIG. 3 is an enlarged local sectional view of the transmission device 11 shown in FIG. 2.

The transmission device 11 is linked with the rack bar 8 by a structure in which an input pulley 12 fixed to an outer periphery of a top end of an output shaft 9a of the electric motor 9 and an output pulley 13 fixed to an outer periphery of the rack bar 8 are linked through a belt 14. Between the output pulley 13 and the rack bar 8, a ball screw mechanism 15, as a speed reducer, having a spiral groove shape is provided.

The ball screw mechanism 15 is formed by a steered shaft-side ball screw groove 16 formed on an outer peripheral surface of the rack bar 8, a nut-side ball screw groove 18 formed on an inner peripheral surface of the nut 17, a plurality of balls 19 circulating between these ball screw grooves 16 and 18 and a tube 20 as a circulation member in which the plurality of balls 19 circulate.

The steered shaft-side ball screw groove 16 is formed so as to form a spiral groove shape on the outer peripheral surface of the rack bar 8. Then, in combination with a spiral groove shape formed on the inner peripheral surface of the annular nut 17 that closes the rack bar 8, a spiral ball circulation passage 21 is formed between these grooves. The plurality of balls 19 circulate in this ball circulation passage 21. The balls 19 support the nut 17 such that the nut 17 can rotate relative to the rack bar 8.

The tube 20 is formed by a synthetic resin-made first tube 20A located at one end side of the ball circulation passage 21 and a synthetic resin-made second tube 20B having the same shape as the first tube 20A and located at the other end side of the ball circulation passage 21. The tube 20 is set at a radially outer side of the nut 17, and supported on an outer peripheral portion of the nut 17 by a clip 22 that is a fixing member. The tube 20 connects the one end side and the other end side of the ball circulation passage 21 so that the balls 19 can circulate from the one end side to the other end side of the ball circulation passage 21.

Such transmission device 11 converts rotation of the motor 9, which is transmitted through the belt 14, into a linear motion of the rack bar 8 while reducing speed of the rotation.

(Nut)

Figure 4:
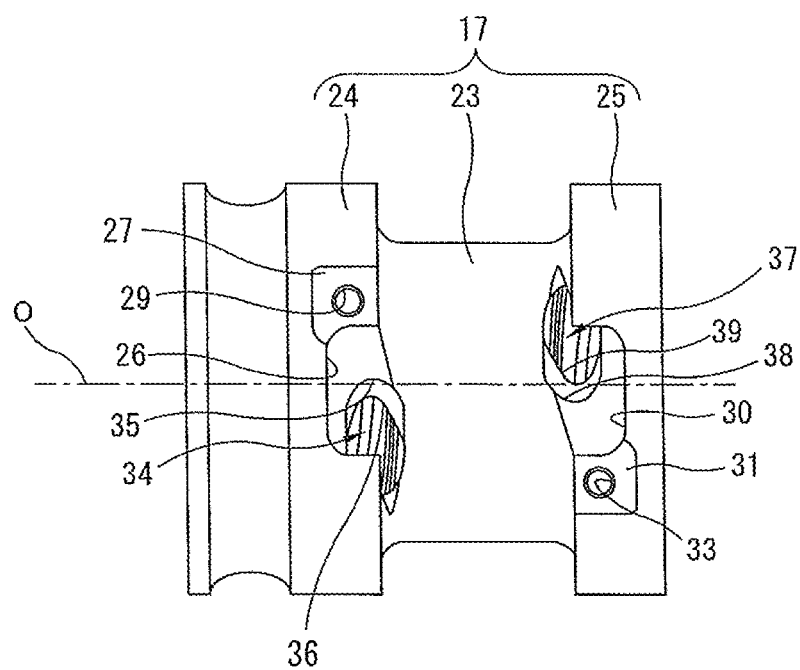
FIG. 4 is a plan view of a nut.

FIG. 4 is a plan view of the nut 17.

The nut 17 is made of metal, and has a cylindrical shape. The nut 17 has a cylindrical main body 23, a first flange 24 formed at one end of the main body 23 and a second flange 25 formed at the other end of the main body 23. The above-mentioned nut-side ball screw groove 18 that forms a part of the spiral ball circulation passage 21 is provided on an inner peripheral surface of the main body 23.

The first flange 24 has, at a position adjacent to the main body 23, a first hollow portion 26 having a rectangularly recessed shape to accommodate a part of the first tube 20A. Further, a first flat surface portion 27, which is a substantially square flat surface, is formed at a position adjacent to the first hollow portion 26 in a circumferential direction of the nut 17 on an outer peripheral portion of the first flange 24. This first flat surface portion 27 is provided with a first screw hole 29 into which an after-mentioned first screw 28 corresponding to a first engagement member is screwed.

Likewise, the second flange 25 has, at a position adjacent to the main body 23, a second hollow portion 30 having a rectangularly recessed shape to accommodate a part of the second tube 20B. Further, a second flat surface portion 31, which is a substantially square flat surface, is formed at a position adjacent to the second hollow portion 30 in the circumferential direction of the nut 17 and opposite to the first flat surface portion 27 with respect to a rotation axis O on an outer peripheral portion of the second flange 25. This second flat surface portion 31 is provided with a second screw hole 33 into which an after-mentioned second screw 32 corresponding to a second engagement member is screwed.

A first communication passage 34 that forms a passage which communicates with an outer peripheral side and an inner peripheral side of the nut 17 and through which the balls 19 pass is formed at a position extending across the first flange 24 and the main body 23. The first communication passage 34 has a first outer peripheral-side opening 35 that opens to an outer peripheral surface of the nut 17 and a first inner peripheral-side opening 36 that opens to the inner peripheral surface of the nut 17.

Likewise, a second communication passage 37 that forms a passage which communicates with the outer peripheral side and the inner peripheral side of the nut 17 and through which the balls 19 pass is formed at a position extending across the second flange 25 and the main body 23. The second communication passage 37 has a second outer peripheral-side opening 38 that opens to the outer peripheral surface of the nut 17 and a second inner peripheral-side opening 39 that opens to the inner peripheral surface of the nut 17.

(First Tube)

Figure 5:
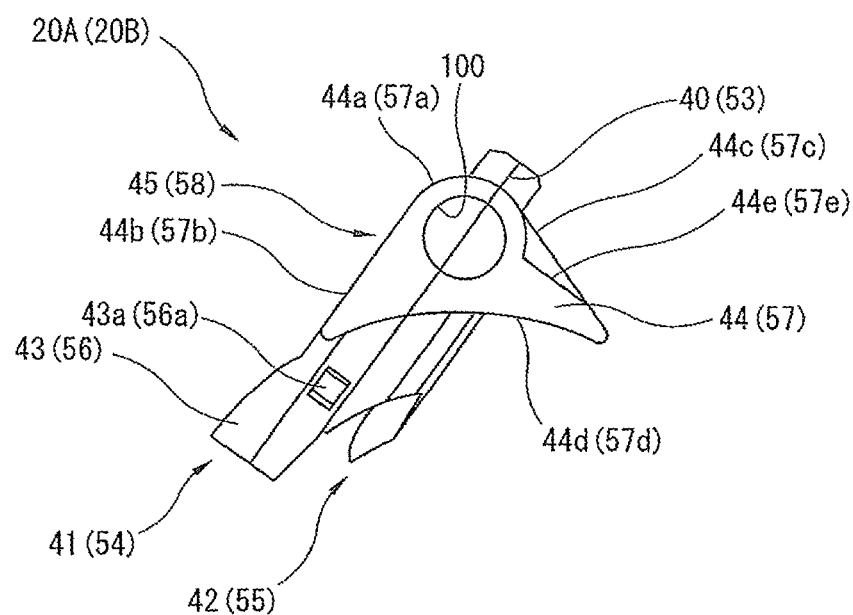
FIG. 5 is a side view of a first tube, viewed from a second flange side.
Figure 6:
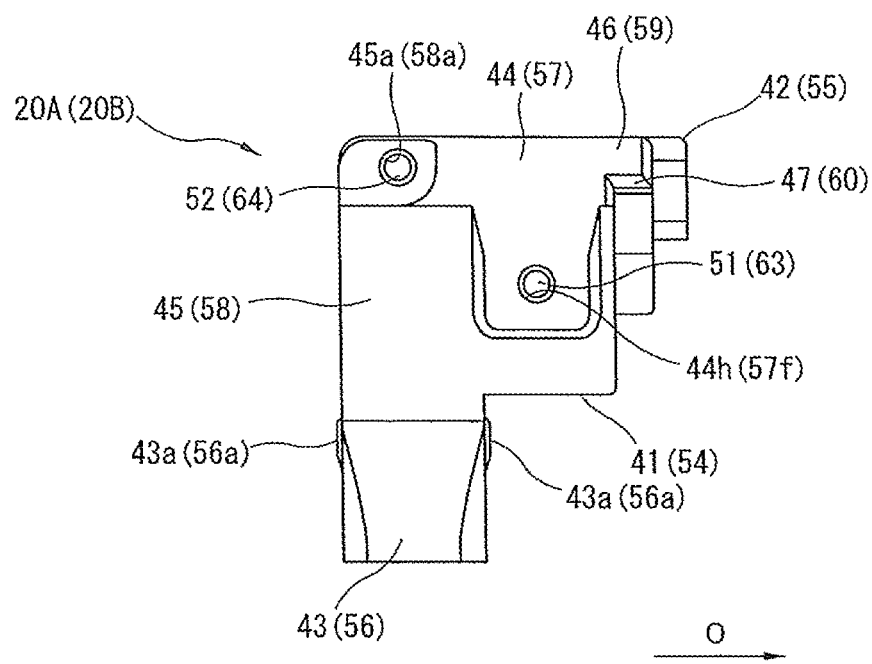
FIG. 6 is a plan view of the first tube.
Figure 7:
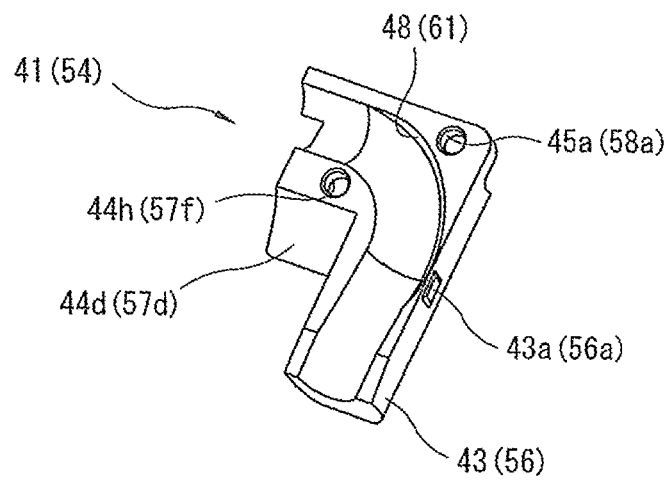
FIG. 7 is a perspective view of the first tube when viewing a first one-side tube element from a bottom side.
Figure 8:
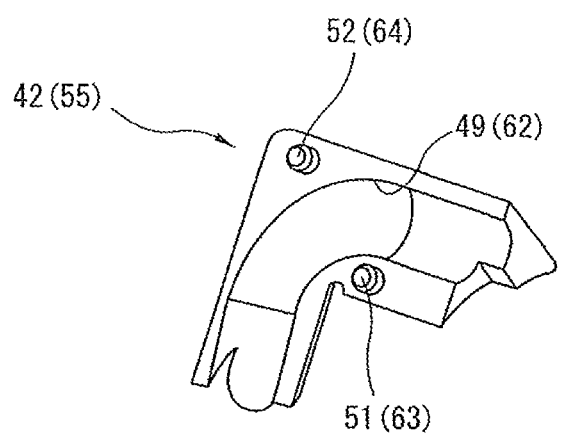
FIG. 8 is a perspective view of the first tube when viewing a first other-side tube element from a bottom side.

FIG. 5 is a side view of the first tube 20A, viewed from the second flange 25 side. FIG. 6 is a plan view of the first tube 20A, viewed from a radial direction of the nut 17. FIG. 7 is a perspective view of the first tube 20A when viewing a first one-side tube element 41 from a bottom side. FIG. 8 is a perspective view of the first tube 20A when viewing a first other-side tube element 42 from a bottom side.

The first tube 20A that is a first circulation member is formed by the first one-side tube element 41 shown in FIG. 7 and the first other-side tube element 42 shown in FIG. 8, which are substantially half-cut-shaped elements when cutting the first tube 20A into almost halves along a dividing surface 40. The first one-side tube element 41 has, at an inner side thereof, a nearly L-shaped curving circulation channel 48. This circulation channel 48 and a circulation channel 49 formed at the first other-side tube element 42 are combined together, then an almost L-shaped passage having a circular shape in cross section is formed. Further, this L-shaped passage and an L-shaped passage formed by after-described circulation channels 61 and 62 of the second tube 20B are combined together, then a U-shaped ball passage 100 having a circular shape in cross section is formed.

As shown in FIG. 7, the first one-side tube element 41 is provided with protrusion fitting holes 45a and 44h. Protrusions 52 and 51 formed at the first other-side tube element 42, shown in FIG. 8, are fitted into these protrusion fitting holes 45a and 44h, then the assembled first tube 20A shown in FIGS. 5 and 6 is obtained.

The first tube 20A has a first inserting part 43 that is inserted into the first outer peripheral-side opening 35 (see FIG. 4) of the first communication passage 34, a first connecting section 44 that is located at an outer peripheral side of the main body 23 of the nut 17 and a first bending section 45 that is bent in the shape of letter L and connects the first inserting part 43 and the first connecting section 44. The first tube 20A is attached to the nut 17 in such an attitude that the first connecting section 44 and the first bending section 45 overlap in a direction of the rotation axis O of the nut 17 which is shown by an arrow in FIG. 6.

As shown in FIG. 5, the first connecting section 44 has an arc 44a that is concentric with the ball passage 100 that is circular in cross section, a linear portion 44b that is formed at the first one-side tube element 41 and connected to the arc 44a, a linear portion 44c that is formed at the first other-side tube element 42 and connected to the arc 44a and a first arcuate portion 44d that is connected to both of the linear portions 44b and 44c. The ball passage 100 is located at a position close to the arc 44a, and a part of the first connecting section 44 which is adjacent to the first arcuate portion 44d is formed relatively thick. The first arcuate portion 44d has an arcuate shape that corresponds to an outer peripheral surface of the main body 23 of the nut 17, and contacts or is contiguous with the outer peripheral surface of the main body 23 when the first tube 20A is attached to the nut 17. On the linear portion 44c of the first other-side tube element 42, a first position stopper contact portion 44e that is a surface sloping down toward the ball passage 100 with respect to the linear portion 44c is formed by cutting a part of the linear portion 44c into a triangle shape. When the clip 22 is connected or fixed to the nut 17, an after-described first connecting end position stopper 75 of the clip 22 contacts or is contiguous with this first position stopper contact portion 44e.

As shown in FIG. 6, the first connecting section 44 further has a step-shaped first connecting end 46 that is an end portion located at an opposite side to the first bending section 45. The first connecting end 46 has a first connecting end contact surface 47 that contacts or is contiguous with an after-mentioned second connecting end contact surface 60 of a second connecting end 59 of the second tube 20B. This first connecting end contact surface 47 is parallel to a direction in which the balls 19 pass through or move in the ball passage 100 provided at inner sides of the first connecting section 44 and a second connecting section 57. That is, the first connecting end contact surface 47 is parallel to a direction in which the balls 19 circulate along the rotation axis O of the nut 17 across the first connecting section 44 and the second connecting section 57.

Further, the first one-side tube element 41 is provided with a pair of protuberances 43a at both sides in the direction of the rotation axis O of the first inserting part 43. The protuberances 43a are compressed and deformed when the first inserting part 43 is inserted into the first communication passage 34 of the nut 17, and are elastically in contact with an inner peripheral surface of the first communication passage 34, thereby preventing the first inserting part 43 from being detached from the first communication passage 34.

(Second Tube)

The second tube 20B that is a second circulation member is formed into the same shape as the first tube 20A. In FIGS. 5 to 8, reference signs with parenthesis denote sections, portions etc. of the second tube 20B.

The second tube 20B is formed by a second one-side tube element 54 shown in FIG. 7 and a second other-side tube element 55 shown in FIG. 8, which are substantially half-cut-shaped elements when cutting the second tube 20B into almost halves along a dividing surface 53. The second one-side tube element 54 has, at an inner side thereof, the nearly L-shaped curving circulation channel 61. This circulation channel 61 and the circulation channel 62 formed at the second other-side tube element 55 are combined together, then an almost L-shaped passage having a circular shape in cross section is formed. Further, this L-shaped passage and the L-shaped passage formed by the circulation channels 48 and 49 of the first tube 20A are combined together, then the U-shaped ball passage 100 having the circular shape in cross section is formed.

As shown in FIG. 7, the second one-side tube element 54 is provided with protrusion fitting holes 58a and 57f. Protrusions 64 and 63 formed at the second other-side tube element 55, shown in FIG. 8, are fitted into these protrusion fitting holes 58a and 57f, then the assembled second tube 20B shown in FIGS. 5 and 6 is obtained.

The second tube 20B has a second inserting part 56 that is inserted into the second outer peripheral-side opening 38 (see FIG. 4) of the second communication passage 37, the second connecting section 57 that is located at the outer peripheral side of the main body 23 of the nut 17 and a second bending section 58 that is bent in the shape of letter L and connects the second inserting part 56 and the second connecting section 57. The second tube 20B is attached to the nut 17 in such an attitude that the second connecting section 57 and the second bending section 58 overlap in the direction of the rotation axis O of the nut 17 which is shown by the arrow in FIG. 6.

As shown in FIG. 5, the second connecting section 57 has an arc 57a that is concentric with the ball passage 100 that is circular in cross section, a linear portion 57b that is formed at the second one-side tube element 54 and connected to the arc 57a, a linear portion 57c that is formed at the second other-side tube element 55 and connected to the arc 57a and a second arcuate portion 57d that is connected to both of the linear portions 57b and 57c. The ball passage 100 is located at a position close to the arc 57a, and a part of the second connecting section 57 which is adjacent to the second arcuate portion 57d is formed relatively thick. The second arcuate portion 57*d* has an arcuate shape that corresponds to the outer peripheral surface of the main body 23 of the nut 17, and contacts or is contiguous with the outer peripheral surface of the main body 23 when the second tube 20B is attached to the nut 17. On the linear portion 57*c* of the second other-side tube element 55, a second position stopper contact portion 57*e* that is a surface sloping down toward the ball passage 100 with respect to the linear portion 57*c* is formed by cutting a part of the linear portion 57*c* into a triangle shape. When the clip 22 is connected or fixed to the nut 17, an after-described second connecting end position stopper 76 of the clip 22 contacts or is contiguous with this second posit ion stopper contact portion 57*e*.

As shown in FIG. 6, the second connecting section 57 further has a step-shaped second connecting end 59 that is an end portion located at an opposite side to the second bending section 58. The second connecting end 59 has a second connecting end contact surface 60 that contacts or is contiguous with the first connecting end contact surface 47 of a first connecting end 46 of the first tube 20A. This second connecting end contact surface 60 is parallel to the direction in which the balls 19 pass through or move in the ball passage 100 provided at the inner sides of the first connecting section 44 and the second connecting section 57. That is, the second connecting end contact surface 60 is parallel to a direction in which the balls 19 circulate along the rotation axis O of the nut 17 across the first connecting section 44 and the second connecting section 57.

Further, the second one-side tube element 54 is provided with a pair of protuberances 56*a* at both sides in the direction of the rotation axis O of the second inserting part 56. The protuberances 56*a* are compressed and deformed when the second inserting part 56 is inserted into the second communication passage 37 of the nut 17, and are elastically in contact with an inner peripheral surface of the second communication passage 37, thereby preventing the second inserting part 56 from being detached from the second communication passage 37.

(Clip)

Figure 9:
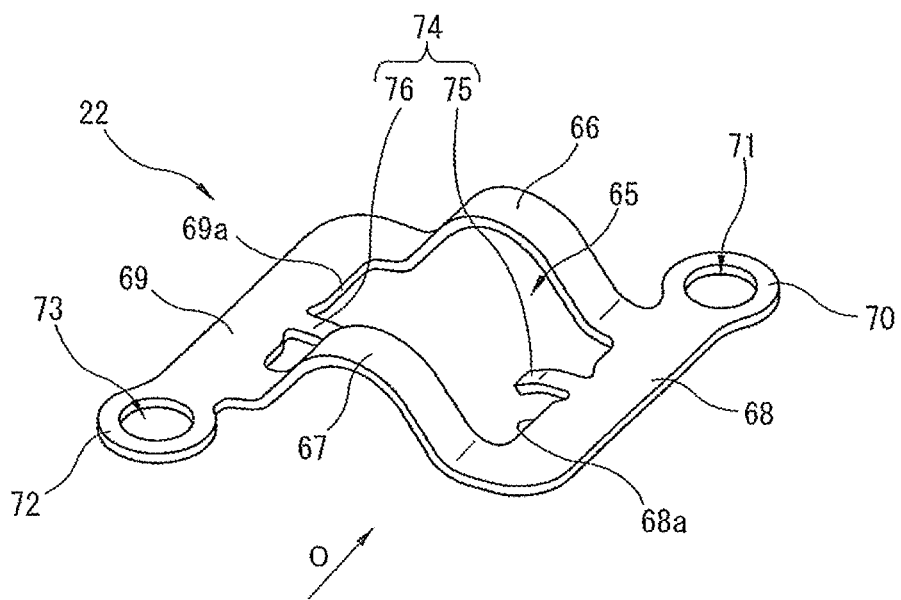
FIG. 9 is a perspective view of a clip according to the first embodiment.
Figure 10:
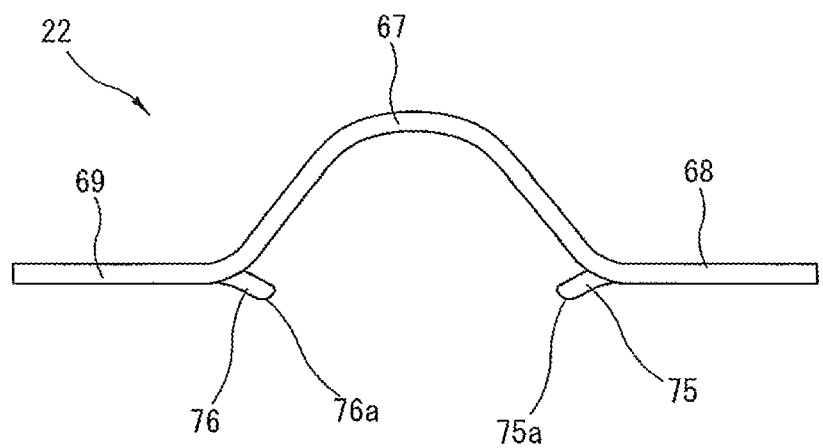
FIG. 10 is a side view of the clip shown in FIG. 9, viewed from a rotation axis direction of a nut.

FIG. 9 is a perspective view of the clip 22 according to the first embodiment. FIG. 10 is an explanatory drawing of the clip 22, viewed from a side of a second inserting part forcing portion 67.

The clip 22 is formed into an almost rectangular frame shape by stamping out an almost rectangular thin metal plate made of metal such as spring steel such that an almost rectangular opening 65 is formed at the middle of the metal plate. Further, an arc-shaped first inserting part forcing portion 66 and the arc-shaped second inserting part forcing portion 67 are formed by press working. The clip 22 has the first inserting part forcing portion 66, the second inserting part forcing portion 67 facing the first inserting part forcing portion 66, a first axial direction connecting portion 68 connecting one ends of the first and second inserting part forcing portions 66 and 6'7 and a second axial direction connecting portion 69 connecting the other ends of the first and second inserting part forcing portions 66 and 67. The clip 22 is set on the outer peripheral portion of the nut 17 in such an attitude that the first and second axial direction connecting portions 68 and 69 extend along the rotation axis O of the nut 17.

Figure 12:
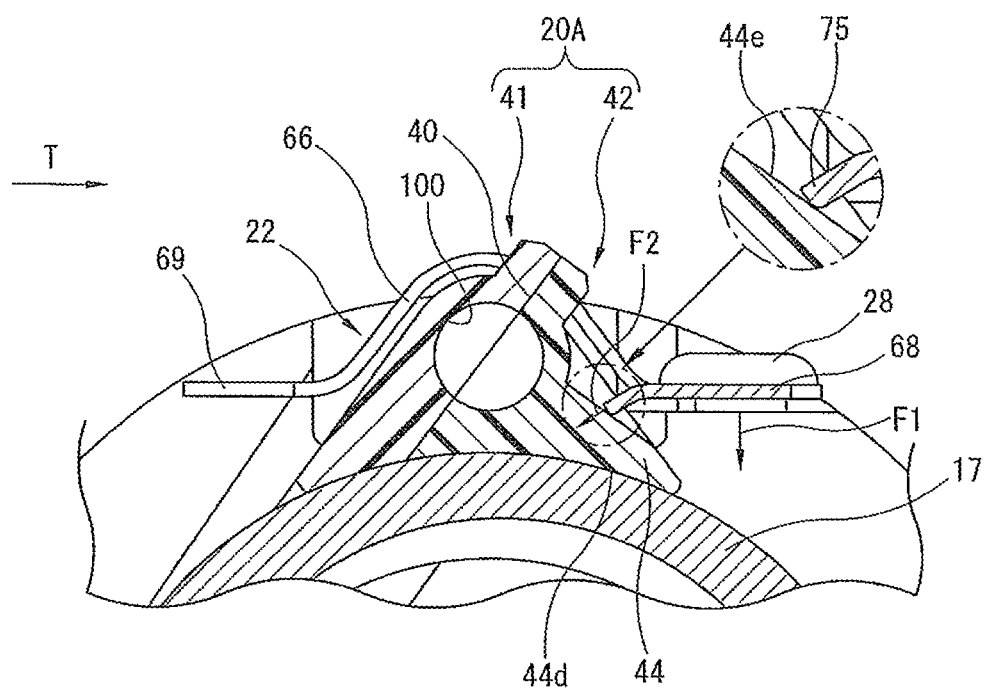
FIG. 12 is a sectional view of the nut etc., taken along a line A-A in FIG. 11.
Figure 13:
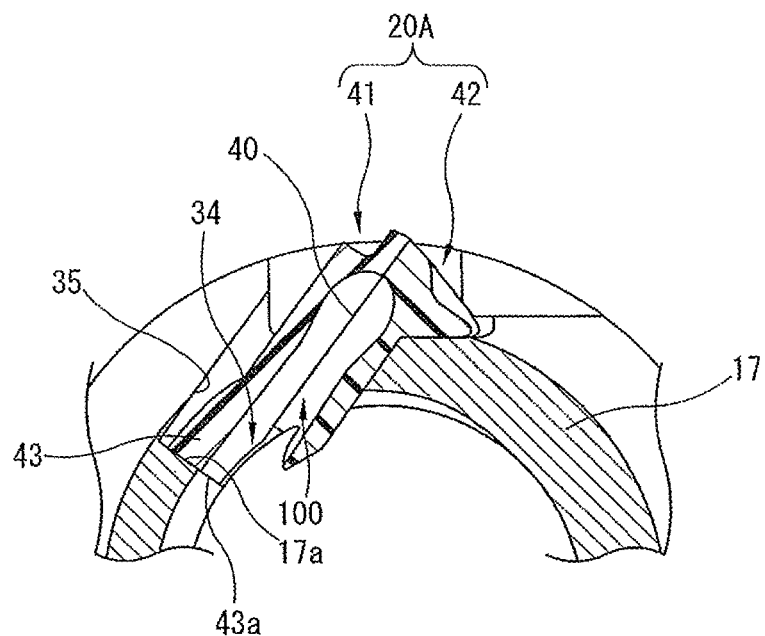
FIG. 13 is a sectional view of the first tube and the nut, obtained by cutting the first tube and the nut along a radial direction of the nut.

The first inserting part forcing portion 66 has an arc shape that extends in a circumferential direction of the rotation axis O of the nut 17, and forces the first inserting part 43 of the first tube 20A in a direction in which the first inserting part 43 is inserted into the first communication passage 34 when the first tube 20A is attached to the nut 17 (see FIGS. 12 and 13).

Likewise, the second inserting part forcing portion 67 has an arc shape that extends in the circumferential direction of the rotation axis O of the nut 17, and forces the second inserting part 56 of the second tube 20B in a direction in which the second inserting part 56 is inserted into the second communication passage 37 when the second tube 20B is attached to the nut 17.

The first axial direction connecting portion 68 has a rectangular plate shape. The first axial direction connecting portion 68 is provided, at one end thereof, with a ring-shaped first fixing portion 70. This first fixing portion 70 has a circular first screw hole (a penetration hole) 71. The first screw 28 is inserted into this first screw hole 71, then the clip 22 is fixed to the nut 17.

On the other hand, in the same manner as the first axial direction connecting portion 68, the second axial direction connecting portion 69 has a rectangular plate shape, and is provided with a ring-shaped second fixing portion 72 at a position diagonally opposite to the first fixing portion 70. This second fixing portion 72 has a circular second screw hole (a penetration hole) 73. The second screw 32 is inserted into this second screw hole 73, then the clip 22 is fixed to the nut 17.

The first axial direction connecting portion 68 and the second axial direction connecting portion 69 have a connecting end position stopper 74 having a shape that stops a relative position shift (relative movement or misalignment) between the first connecting end 46 of the first tube 20A and the second connecting end 59 of the second tube 20B. The connecting end position stopper 74 has a shape that extends in the circumferential direction of the rotation axis O of the nut 17. That is, the connecting end position stopper 74 has the plate-shaped first connecting end position stopper 75 that protrudes from an inner edge portion 68*a* of the first axial direction connecting portion 68 toward the opening 65 and the plate-shaped second connecting end position stopper 76 that protrudes from an inner edge portion 69*a* of the second axial direction connecting portion 69 toward the opening 65. In other words, the connecting end position stopper 74 has the first connecting end position stopper 75 that slopes down in an opposite direction to the arc-shaped first inserting part forcing portion 66 from the first axial direction connecting portion 68 and the second connecting end position stopper 76 that slopes down in an opposite direction to the arc-shaped second inserting part forcing portion 67 from the second axial direction connecting portion 69.

The first connecting end position stopper 75 is positioned at the first fixing portion 70 side of the inner edge portion 68*a* of the first axial direction connecting portion 68, whereas the second connecting end position stopper 76 is positioned at the second fixing portion 72 side of the inner edge portion 69*a* of the second axial direction connecting portion 69. Therefore, the first connecting end position stopper 75 and the second connecting end position stopper 76 are located so as not to face each other at the mutually parallel inner edge portions 68*a* and 69*a*.

A top end of the first connecting end position stopper 75 is formed into a shape such that the top end can contact the first position stopper contact portion 44*e* (see FIG. 5) of the first tube 20A. That is, the first connecting end position stopper 75 has, at the top end thereof, a first round surface portion 75*a* whose longitudinal cross section is a round shape at a contact position with the first position stopper contact portion 44*e*. The first round surface portion 75*a* elastically contacts the first position stopper contact portion 44e of the first tube 20A by an elastic deformation of the clip 22 when the first fixing portion 70 is fixed to the nut 17 with the first screw 28. With this contact, the first connecting end position stopper 75 stops a movement of the first tube 20A in a direction in which the first connecting end contact surface 47 of the first tube 20A separates from the second connecting end contact surface 60 of the second tube 20B.

In the same manner as the top end of the first connecting end position stopper 75, a top end of the second connecting end position stopper 76 is formed into a shape such that the top end can contact the second position stopper contact portion 57e (see FIG. 5) of the second tube 205. That is, the second connecting end position stopper 76 has, at the top end thereof, a second round surface portion 76a whose longitudinal cross section is a round shape at a contact position with the second position stopper contact portion 57e. The second round surface portion 76a elastically contacts the second position stopper contact portion 57e of the second tube 20B by the elastic deformation of the clip 22 when the second fixing portion 72 is fixed to the nut 17 with the second screw 32. With this contact, the second connecting end position stopper 76 stops a movement of the second tube 20B in a direction in which the second connecting end contact surface 60 of the second tube 20B separates from the first connecting end contact surface 47 of the first tube 20A.

Figure 11:
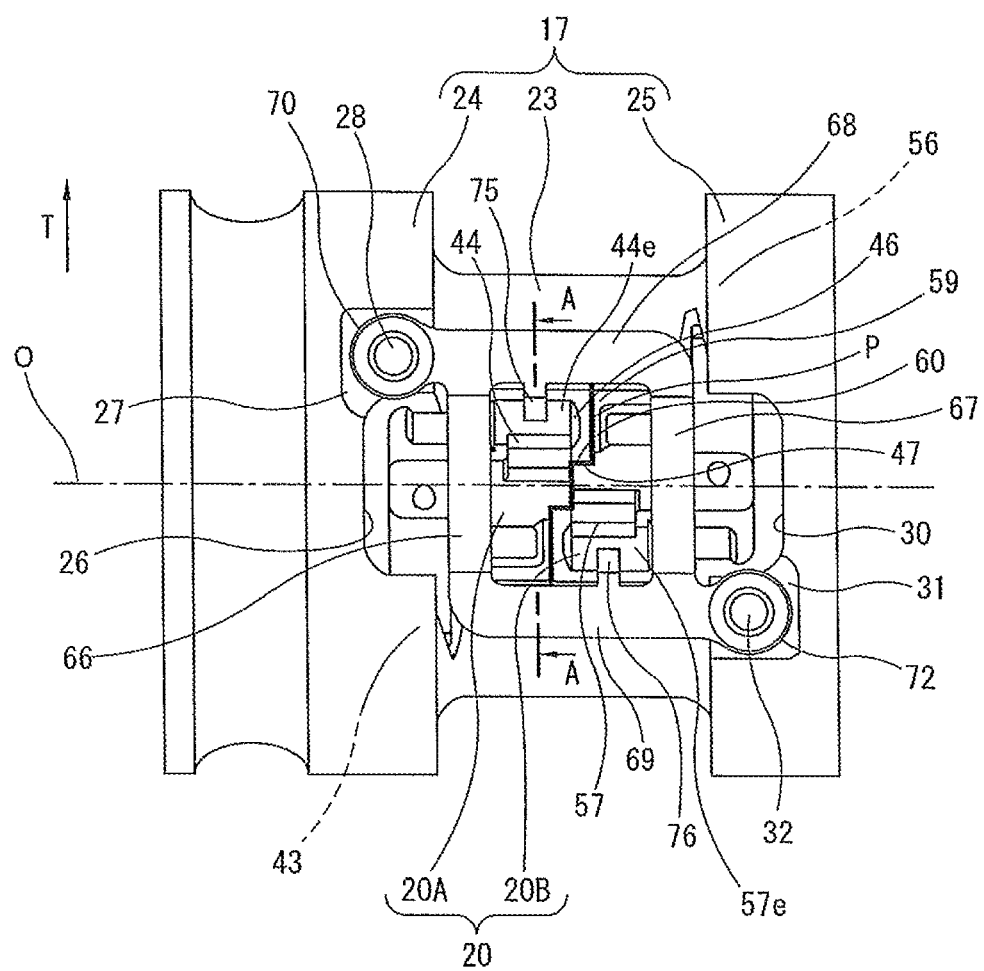
FIG. 11 is an explanatory drawing showing the nut, the tube and the clip after being assembled.

FIG. 11 is an explanatory drawing showing the nut 17, the tube 20 and the clip 22 after being assembled. FIG. 12 is a sectional view of the nut 17 etc., taken along a line A-A in FIG. 11.

Next, a fixing method of the first tube 20A, the second tube 20B and the clip 22 to the nut 17 will be explained with reference to FIGS. 11 and 12.

First, the first inserting part 43 and the second inserting part 56 (see FIGS. 5 to 7) of the first tube 20A and the second tube 20B are inserted into the first outer peripheral-side opening 35 and the second outer peripheral-side opening 38 (see FIG. 4) of the nut 17 respectively. After inserting the first inserting part 43 and the second inserting part 56, as shown in FIG. 11, the step-shaped first connecting end 46 of the first tube 20A and the step-shaped second connecting end 59 of the second tube 20B are butted against or connected to each other in the direction of the rotation axis O of the nut 17 with the first arcuate portion 44d and the second arcuate portion 57d being contiguous with an outer peripheral portion of the main body 23 of the nut 17 (see FIG. 12). In FIG. 11, a boundary P between the first connecting end 46 and the second connecting end 59 butted against each other is depicted by a thick line. Further, the second connecting end contact surface 60 of the step-shaped second connecting end 59 is parallel to the first connecting end contact surface 47 of the first connecting end 46, and further the second connecting end contact surface 60 faces the first connecting end contact surface 47. That is, by the fact that the second connecting end contact surface 60 contacts the first connecting end contact surface 47, a movement of the first connecting end contact surface 47 along a tangent direction T of the nut 17, which is a direction orthogonal to the direction of the rotation axis O of the nut 17, is limited.

Then, the clip 22 is placed onto the nut 17 such that the clip 22 covers the first tube 20A and the second tube 20B attached to the outer peripheral portion of the nut 17 from above. Here, the clip 22 is placed onto the nut 17 so that positions of the first and second screw holes 71 and 73 (see FIG. 9) of the first and second fixing portions 70 and 72 correspond to positions of the first and second screw holes 29 and 33 of the nut 17 respectively in such an attitude that the first and second axial direction connecting portions 68 and 69 extend along the direction of the rotation axis O of the nut 17. After placing the clip 22, as shown in FIG. 11, the first inserting part forcing portion 66 and the second inserting part forcing portion 67 cover a part of the first connecting end 46 of the first tube 20A and a part of the second connecting end 59 of the second tube 20B respectively.

Further, as can be seen in FIG. 11, each width of the first and second connecting end position stoppers 75 and 76 along the direction of the rotation axis O of the nut 17 is smaller than each width of the first and second inserting part forcing portions 66 and 67 along the direction of the rotation axis O of the nut 17.

Next, the first and second screws 28 and 32 are screwed into the first and second screw holes 29 and 33 of the nut 17 through the screw holes 71 and 73 of the fixing portions 70 and 72 of the clip 22. By and according to these screwing, the spring steel-made sloping first and second connecting end position stoppers 75 and 76 are elastically deformed in a direction in which these first and second connecting end position stoppers 75 and 76 are pressed by the first and second tubes 20A and 20B, and the first and second connecting end position stoppers 75 and 76 elastically contact the first and second position stopper contact portions 44e and 57e of the first and second tubes 20A and 20B respectively. At this time, as shown in FIG. 12, as a component of force of a force F1 exerted on the nut 17 by the first screw 28, a force F2 in a direction along the slope of the first connecting end position stopper 75 occurs.

The first and second tubes 20A and 20B are forced by the contact of the first and second connecting end position stoppers 75 and 76 to the first and second position stopper contact portions 44e and 57e, then the relative movement of the first and second tubes 20A and 20B in the direction in which the first connecting end contact surface 47 and the second connecting end contact surface 60 separate from each other is stopped.

Moreover, as shown in FIG. 12, a part located on an extension line of the force exerted on the first position stopper contact portion 44e by the sloping first connecting end position stopper 75 is the thicker part of the first connecting section 44 which is adjacent to the first arcuate portion 44d of the first tube 20A, and the ball passage 100 is not located at this part.

Furthermore, as shown in FIG. 11, the first connecting end position stopper 75 is located at a position close to the first connecting end 46 rather than the first inserting part forcing portion 66. That is, in FIG. 11, a position, along the direction of the rotation axis O of the nut 17, of the first connecting end position stopper 75 is at an inner side of the nut 17 with respect to the first inserting part forcing portion 66. Therefore, a distance from the first inserting part 43 to the first connecting end position stopper 75 is longer than a distance from the first inserting part 43 to the first inserting part forcing portion 66.

Likewise, the second connecting end position stopper 76 is located at a position close to the second connecting end 59 rather than the second inserting part forcing portion 67. That is, in FIG. 11, a position, along the direction of the rotation axis O of the nut 17, of the second connecting end position stopper 76 is at an inner side of the nut 17 with respect to the second inserting part forcing portion 67. Therefore, a distance from the second inserting part 56 to the second connecting end position stopper 76 is longer than a distance from the second inserting part 56 to the second inserting part forcing portion 67.

FIG. 13 is a sectional view of the first tube 20A and the nut 17, obtained by cutting the first tube 20A and the nut 17 along a radial direction of the nut 17.

As shown in FIG. 13, in a state in which the first inserting part 43 of the first tube 20A is inserted into the first outer peripheral-side opening 35 of the nut 17, each protuberance 43a of the first inserting part 43 is in contact with a contact portion 17a that is formed at the nut 17 and has a flat surface.

Further, the ball passage 100 communicates with the spiral ball circulation passage 21 (see FIGS. 2 and 3) formed between the steered shaft-side ball screw groove 16 and the nut-side ball screw groove 18 through the first communication passage 34.

Accordingly, the balls 19 circulate through the ball passage 100 from the ball circulation passage 21 while passing through the first communication passage 34 and the second communication passage 37, then the balls 19 are movable between the first tube 20A and the second tube 20B.

[Effect of First Embodiment]

Figure 14:
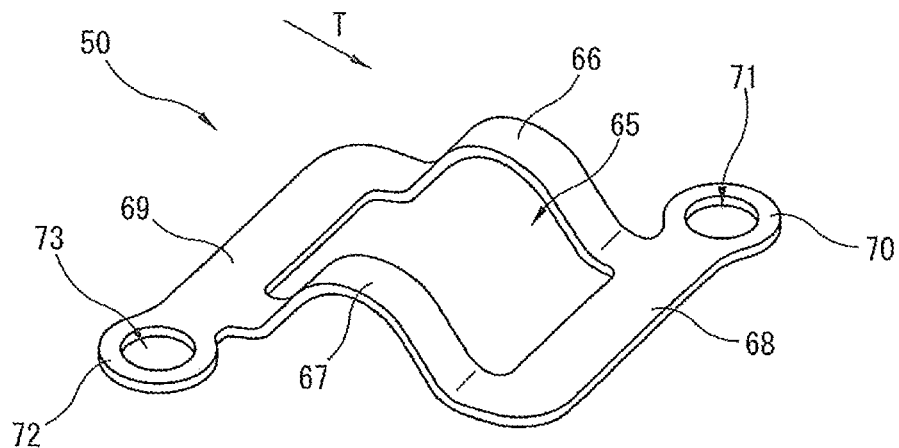
FIG. 14 is a perspective view of a clip of a related art.

FIG. 14 is a perspective view of a clip 50 of a related art.

As compared with the clip 22 of the first embodiment, the clip 50 of the related art has no first connecting end position stopper and no second connecting end position stopper at the first axial direction connecting portion 68 and the second axial direction connecting portion 69 respectively. In a case where the first tube and the second tube are supported on the nut by such related art clip 50, the pair of these tubes are forced by the first inserting part forcing portion 66 and the second inserting part forcing portion 67 in the radial direction of the nut. However, since the first connecting end position stopper and the second connecting end position stopper are not provided, it is not possible to adequately force the pair of tubes in the tangent direction T of the nut. More specifically, in the case of a structure of the clip 50, relatively large gaps exist or remain between the first tube, the second tube and the first and second axial direction connecting portions 68 and 69, and consequently, the clip 50 cannot adequately force the first tube and the second tube in the tangent direction T of the nut. If the ball screw rotates at high speed in a state in which the pair of tubes are supported by such related art clip 50, a high load is imposed on the first tube and the second tube due to rapid acceleration of the balls. As a consequence, there is a risk that the butting connecting ends of the pair of tubes will be relatively shifted or get misaligned in the tangent direction T of the nut.

In contrast to this, in the first embodiment, the power steering device 1 has the rack bar 8 having the spiral steered shaft-side ball screw groove 16; the nut 17 having the main body 23, the nut-side ball screw groove 18, the first communication passage 34 and the second communication passage 37, wherein the main body 23 has the cylindrical shape and the rack bar 8 is inserted into the main body 23, the nut-side ball screw groove 18 is the spiral groove formed at the inner peripheral side of the main body 23, the first communication passage 34 communicates with the inner peripheral side and the outer peripheral side of the main body 23, and the second communication passage 37 communicates with the inner peripheral side and the outer peripheral side of the main body 23; a plurality of balls 19 provided movable between the steered shaft-side ball screw groove 16 and the nut-side ball screw groove 18 and supporting the nut 17 such that the nut 17 can rotate relative to the rack bar 8; the tubular-shaped first tube 20A having the first inserting part 43, the first bending section 45, the first connecting section 44 and the first connecting end 46, wherein the first inserting part 43 is inserted into the first communication passage 34, the first connecting section 44 is located at the outer peripheral side of the nut 17, and the first bending section 45 is provided between the first inserting part 43 and the first connecting section 44; the tubular-shaped second tube 20B having the second inserting part 56, the second bending section 58, the second connecting section 57 and the second connecting end 59, wherein the second inserting part 56 is inserted into the second communication passage 37, the second connecting section 57 is located at the outer peripheral side of the nut 17, the second bending section 58 is provided between the second inserting part 56 and the second connecting section 57, and the second connecting end 59 is provided at the second connecting section 57 on an opposite side to the second bending section 58 such that the second connecting end 59 faces the first connecting end 46 of the first connecting section 44 and the plurality of balls 19 are movable between the first tube 20A and the second tube 20B; the clip 22 having the first inserting part forcing portion 66, the second inserting part forcing portion 67 and the connecting end position stopper 74, wherein the first inserting part forcing portion 66 forces the first inserting part 43 in the direction in which the first inserting part 43 is inserted into the first communication passage 34, the second inserting part forcing portion 67 forces the second inserting part 56 in the direction in which the second inserting part 56 is inserted into the second communication passage 37, and the connecting end position stopper 74 has the shape that stops a relative position shift between the first connecting end 46 and the second connecting end 59; and the electric motor 9 driving and rotating the nut 17 and moving the rack bar 8 in the axial direction of the rack bar 8 by rotation of the nut 17.

As described above, since the clip 22 is provided with the connecting end position stopper 74, i.e. the first connecting end position stopper 75 and the second connecting end position stopper 76, both ends, in the tangent direction T, of the first connecting end 46 and the second connecting end 59 butting against each other are forced by the connecting end position stoppers 75 and 76. With this, the relative position shift (or the relative movement) of the first connecting end 46 and the second connecting end 59 along the tangent direction T is suppressed. The balls 19 can therefore move and circulate smoothly in and through the ball passage 100 formed in the first tube 20A and the second tube 20B. Hence, power transmission of the ball screw mechanism 15 can be improved.

Further, since the connecting end position stoppers 75 and 76 are provided at different positions from the inserting part forcing portions 66 and 67, it is possible to prevent urging forces from the inserting part forcing portions 66 and 67 from acting on the connecting end position stoppers 75 and 76. Therefore, excessive urging forces from the inserting part forcing portions 66 and 67 do not act on the connecting ends 46 and 59 through the connecting end position stoppers 75 and 76. In addition, since an urging force by the clip 22 is dispersed to the inserting part forcing portions 66 and 67 and the connecting end position stoppers 75 and 76, concentrated action of the excessive urging forces from the inserting part forcing portions 66 and 67 on the tubes 20A and 20B is lessened. Thus, deformation of the connecting ends 46 and 59 is suppressed, and a shape of the ball passage 100 located at the inner sides of the connecting ends 46 and 59 is maintained. The balls 19 can therefore move and circulate smoothly in and through the ball passage 100, and power transmission of the ball screw mechanism 15 can be improved.

Further, in the first embodiment, the connecting end position stoppers 75 and 76 are located at the position close to the first connecting end 46 rather than the first inserting part forcing portion 66, and at the position close to the second connecting end 59 rather than the second inserting part forcing portion 67.

By providing the connecting end position stoppers 75 and 76 in this manner, the positions, along the direction of the rotation axis O of the nut 17, of the connecting end position stoppers 75 and 76 are at inner sides of the nut 17 with respect to the inserting part forcing portions 66 and 67 respectively. Therefore, the distances from the inserting parts 43 and 56 to the connecting end position stoppers 75 and 76 are longer than the distances from the inserting parts 43 and 56 to the inserting part forcing portions 66 and 67 respectively. Accordingly, upon suppressing rotation of the first tube 20A with the first inserting part 43 being a center and suppressing rotation of the second tube 20B with the second inserting part 56 being a center, limitation of rotation of the first tube 20A and the second tube 20B is performed at portions where arm lengths of rotation moments of the first tube 20A and the second tube 20B are relatively large. Therefore, urging forces from the connecting end position stoppers 75 and 76 can be small, and the relative position shift (the relative movement or the misalignment) of the first connecting end 46 and the second connecting end 59 along the tangent direction T can be effectively suppressed.

In addition, since the urging forces from the connecting end position stoppers 75 and 76 are small, an occurrence of internal stress at the connecting ends 46 and 59 of the tubes 20A and 20S and deformation of the connecting ends 46 and 59 of the tubes 20A and 20B can be suppressed.

Moreover, in the first embodiment, the first tube 20A has the first connecting end contact surface 47. The first connecting end contact surface 47 is parallel to the direction in which the balls 19 pass through the inner sides of the first connecting section 44 and the second connecting section 57. The second tube 20B has the second connecting end contact surface 60. The second connecting end contact surface 60 is parallel to the first connecting end contact surface 47 and faces the first connecting end contact surface 47. The connecting end position stopper 74 has the first connecting end position stopper 75 and the second connecting end position stopper 76. The first connecting end position stopper 75 stops the movement of the first connecting end contact surface 47 in the direction in which the first connecting end contact surface 47 separates from the second connecting end contact surface 60. The second connecting end position stopper 76 stops the movement of the second connecting end contact surface 60 in the direction in which the second connecting end contact surface 60 separates from the first connecting end contact surface 47.

As describe above, by forming the first connecting end contact surface 47 and the second connecting end contact surface 60 into hook shapes (or step shapes) and bringing these hooked (or stepped) connecting end contact surfaces 47 and 60 into contact with each other, as compared with a case where the connecting end contact surfaces 47 and 60 are not provided, the relative movement of the first and second tubes 20A and 20B is stopped. With this, a relative position of the first connecting end contact surface 47 and the second connecting end contact surface 60 is uniquely determined.

Further, since the connecting end contact surfaces 47 and 60 each having a relatively large area are in contact with each other, when the urging forces from the connecting end position stoppers 75 and 76 act on the connecting ends 46 and 59, there is a tendency for surface pressures put on the connecting end contact surfaces 47 and 60 to be dispersed.

Therefore, stress concentration occurring at the tubes 20A and 20B by the urging forces from the connecting end position stoppers 75 and 76 can be lessened.

Furthermore, in the first embodiment, the clip 22 has the first fixing portion 70 and the second fixing portion 72. The first fixing portion 70 has the first screw hole 71 into which the first screw 28 for fixing the clip 22 to the nut 17 is inserted. The second fixing portion 72 has the circular second screw hole 73 into which the second screw 32 for fixing the clip 22 to the nut 17 is inserted. The connecting end position stopper 74 has the first connecting end position stopper 75 and the second connecting end position stopper 76. The first connecting end position stopper 75 generates an urging force acting on the first connecting section 44 by the elastic deformation of the clip 22 when the first fixing portion 70 is fixed to the nut 17 with the first screw 28. The second connecting end position stopper 76 generates an urging force acting on the second connecting section 57 by the elastic deformation of the clip 22 when the second fixing portion 72 is fixed to the nut 17 with the second screw 32.

With this, the first tube 20A and the second tube 20B can be efficiently supported on the nut 17 by the urging force generated by the clip 22 itself without requiring an additional forcing member. Also, since the additional forcing member is not needed, a configuration of the power steering device 1 can be simplified. This can reduce a manufacturing cost of the power steering device 1.

In addition, in the first embodiment, the first tube 20A has the first position stopper contact portion 44e. The first connecting end position stopper 75 has the first round surface portion 75a. The first round surface portion 75a has the round shape, and contacts the first position stopper contact portion 44e. The second tube 20B has the second position stopper contact portion 57e. The second connecting end position stopper 76 has the second round surface portion 76a. The second round surface portion 76a has the round shape, and contacts the second position stopper contact portion 57e.

Therefore, as compared with a case where each of the connecting end position stoppers 75 and 76 has a corner or an edge, damage to the position stopper contact portions 44e and 57e due to contact of the connecting end position stoppers 75 and 76 can be suppressed.

In the first embodiment, the first inserting part forcing portion 66 has the shape that extends in the circumferential direction of the rotation axis O of the nut 17. The second inserting part forcing portion 67 has the shape that extends in the circumferential direction of the rotation axis O of the nut 17. The connecting end position stoppers 75 and 76 have the shapes that extend in the circumferential direction of the rotation axis O of the nut 17. Each width of the first and second connecting end position stoppers 75 and 76 along the direction of the rotation axis O of the nut 17 is smaller than each width of the first and second inserting part forcing portions 66 and 67 along the direction of the rotation axis O of the nut 17.

With this, rigidity of the connecting end position stoppers 75 and 76 is smaller than that of the inserting part forcing portions 66 and 67, then the urging forces acting on the connecting ends 46 and 59 by the connecting end position stoppers 75 and 76 are small. The internal stress occurring at the connecting ends 46 and 59 of the tubes 20A and 20B by the urging forces from the connecting end position stoppers 75 and 76 can be lessened.

Further, in the first embodiment, the clip 22 is made of spring steel.

Thus, the first tube 20A and the second tube 20B can be properly supported on the nut 17 by an elastic force generated by the clip 22 itself without requiring an additional forcing member such as a coil spring. Also, since the additional forcing member is not needed, a manufacturing cost of the power steering device 1 can be reduced.

In the first embodiment, the first connecting section 44 and the second connecting section 57 form the ball passage 100. The f first tube 20A has the first position stopper contact portion 44e. The second tube 20B has the second position stopper contact portion 57e. The connecting end position stopper 74 has the first connecting end position stopper 75 and the second connecting end position stopper 76. In the state in which the first connecting end position stopper 75 contacts the first position stopper contact portion 44e, the ball passage 100 is not located on the extension line of the force exerted on the first position stopper contact portion 44e by the first connecting end position stopper 75. In the state in which the second connecting end position stopper 76 contacts the second position stopper contact portion 57e, the ball passage 100 is not located on the extension line of the force exerted on the second position stopper contact portion 57e by the second connecting end position stopper 76.

Even if deformation of the tubes 20A and 20B occurs due to contact of the connecting end position stoppers 75 and 76, it is possible to prevent the ball passage 100 from being affected by this deformation. The shape of the ball passage 100 is therefore properly maintained, and the balls 19 can move and circulate smoothly in and through the ball passage 100. Power transmission of the ball screw mechanism 15 can thus be improved.

Second Embodiment

Figure 15:
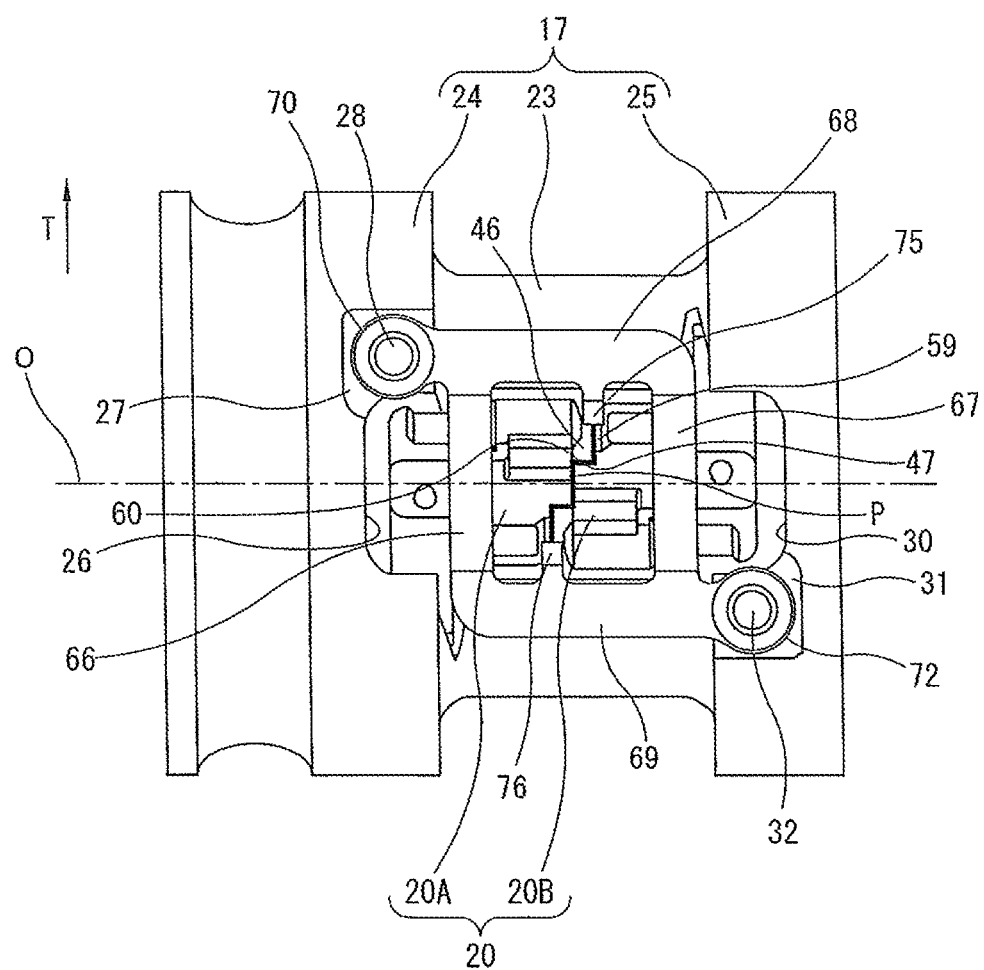
FIG. 15 is an explanatory drawing showing the nut, the tube and a clip according to a second embodiment.

FIG. 15 is an explanatory drawing showing the nut 17, the tube 20 and a clip 22 according to a second embodiment.

In the second embodiment, the first connecting end position stopper 75 and the second connecting end position stopper 76 have shapes that extend across the boundary P (the line depicted by the thick line in FIG. 15) between the first connecting end 46 of the first tube 20A and the second connecting end 59 of the second tube 20B. That is, as shown in FIG. 15, each of the first connecting end position stopper 75 and the second connecting end posit ion stopper 76 is located at a position that overlaps the boundary P between the first connecting end 46 and the second connecting end 59 and the tangent direction T. Also, each of the first connecting end position stopper 75 and the second connecting end position stopper 76 is in contact with both of the first connecting end 46 and the second connecting end 59.

[Effect of Second Embodiment]

In the second embodiment, the connecting end position stoppers 75 and 76 have the shapes that extend across the boundary between the first connecting end 46 and the second connecting end 59.

Therefore, the connecting end position stoppers 75 and 76 force both the first connecting end 46 and the second connecting end 59. It is thus possible to force the step-shaped connecting end contact surfaces 47 and 60 more efficiently.

Further, since the connecting end position stoppers 75 and 76 force the both first and second connecting ends 46 and 59, even if the tubes 20A and 20B do not have the connecting end contact surfaces 47 and 60 of the connecting ends 46 and 59, positions of the connecting ends 46 and 59 are fixed by the connecting end position stoppers 75 and 76 themselves. The relative position shift (or the relative movement) of the connecting ends 46 and 59 along the tangent direction T can therefore be suppressed.

Third Embodiment

Figure 16:
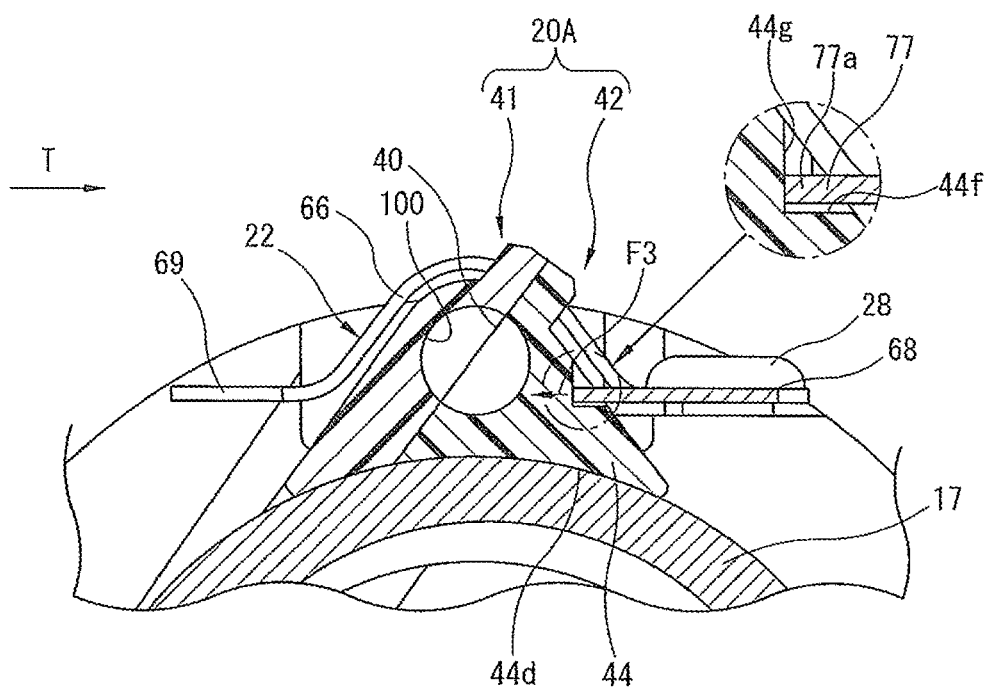
FIG. 16 is a sectional view showing the nut, the first tube and a clip according to a third embodiment.

FIG. 16 is a sectional view showing the nut 17, the first tube 20A and a clip 22 according to a third embodiment.

As shown in FIG. 16, in the third embodiment, at the first connecting section 44, the first other-side tube element 42 is cut into a V-shape formed by a surface 44f that is parallel to the tangent direction T of the nut 17 which is tangent to the rotation axis O of the nut 17 and a first position stopper contact portion 44g that is a surface perpendicular to the tangent direction T of the nut 17.

Likewise, the second other-side tube element 55 (see FIG. 5) has a surface and a second position stopper contact portion which are formed in the same manner as the surface 44f and the first position stopper contact portion 44g respectively.

Further, a first connecting end position stopper 77 that extends on the same surface as the first axial direction connecting portion 68 of the clip 22 is formed at this first axial direction connecting portion 68.

Likewise, a second connecting end position stopper having the same shape as the first connecting end position stopper 77 is formed at the second axial direction connecting portion 69 of the clip 22.

A distance between a top end 77a of the first connecting end position stopper 77 and a top end of the second connecting end position stopper along the tangent direction T of the nut 17 before assembling is narrower (shorter) than a distance between the first position stopper contact portion 44g and the second position stopper contact portion along the tangent direction T of the nut 17. Then, in an assembled state in which the clip 22 is attached to the first and second tubes 20A and 20B, the top end 77a of the first connecting end position stopper 77 and the top end of the second connecting end position stopper bite into the first position stopper contact portion 44g and the second position stopper contact portion respectively. Therefore, when attaching the clip 22 to the first and second tubes 20A and 20B, the top end 77a of the first connecting end position stopper 77 exerts a force F3 along the tangent direction T of the nut 17 on the first position stopper contact portion 44g of the first other-side tube element 42.

[Effect of Third Embodiment]

In the third embodiment, the first tube 20A has the first position stopper contact portion 44g, and the second tube 20B has the second position stopper contact portion. The first position stopper contact portion 44g is the surface perpendicular to the tangent direction T of the nut 17 which is tangent to the rotation axis O of the nut 17, and is formed into a shape such that the first connecting end position stopper 77 can contact the first position stopper contact portion 44g. The second position stopper contact portion is the surface perpendicular to the tangent direction T of the nut 17 which is tangent to the rotation axis O of the nut 17, and is formed into a shape such that the second connecting end position stopper can contact the second position stopper contact portion.

In a case like the first embodiment where the connecting end position stoppers 75 and 76 slope down with respect to the tangent direction T of the nut 17, a direction of the force component F2 generated when the connecting end position stoppers 75 and 76 contact the position stopper contact portions 44e and 57e by screwing of the screws 28 and 32 is also a sloping direction with respect to the tangent direction T of the nut 17. That is, because the force component F2 does not act along the tangent direction T of the nut 17, the connecting ends 46 and 59 are not adequately forced. This might pose a risk of the relative position shift (the relative movement or the misalignment) of the connecting ends 46 and 59 along the tangent direction T.

However, by employing a structure of the third embodiment, such force component F2 is not generated, and the first connecting end position stopper 77 and the second connecting end position stopper can directly exert forces along the tangent direction T on the first position stopper contact portion 44g and the second position stopper contact portion. Hence, the relative position shift (the relative movement or the misalignment) of the connecting ends 46 and 59 along the tangent direction. T can be effectively suppressed.

Fourth Embodiment

Figure 17:
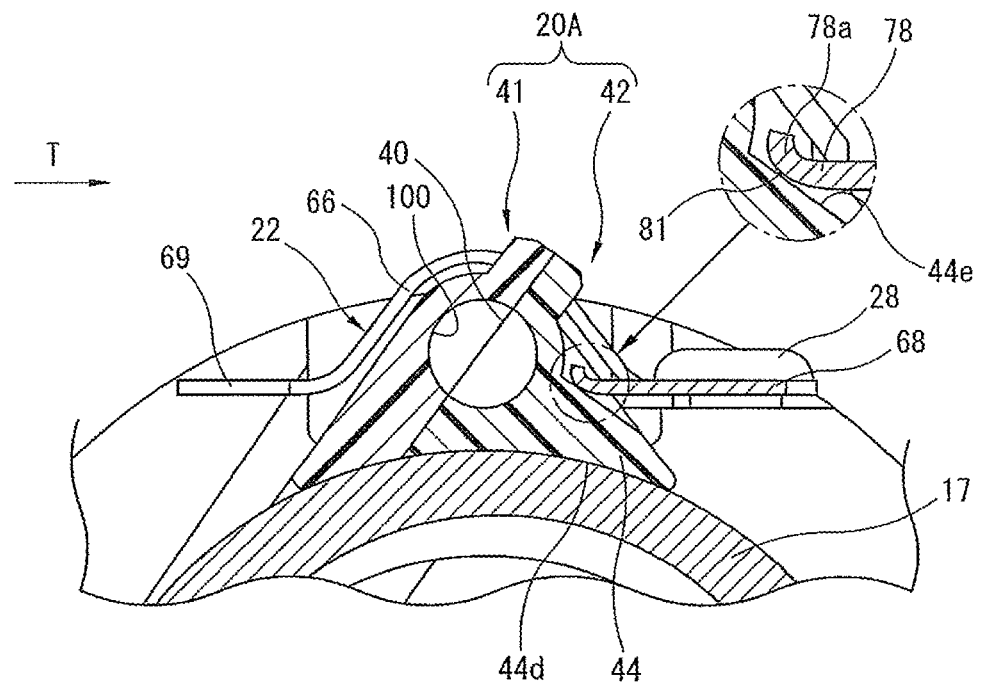
FIG. 17 is a sectional view showing the nut, the first tube and a clip according to a fourth embodiment.

FIG. 17 is a sectional view showing the nut 17, the first tube 20A and a clip 22 according to a fourth embodiment.

In the fourth embodiment, a first connecting end position stopper 78 of the clip 22 has a first curving portion 78a having a curved shape that is formed by curving a top end of the first connecting end position stopper 78 to the first inserting part forcing portion 66 side. As shown in FIG. 17, the first curving portion 78a has, at the nut 17 side, a first arc portion 81 whose longitudinal cross section is an arc shape. This first arc portion 81 contacts the first position stopper contact portion 44e.

[Effect of Fourth Embodiment]

In the fourth embodiment, the first tube 20A has the first position stopper contact portion 44e, and the first connecting end position stopper 78 has the first curving portion 78a. The first curving portion 78a has the curved shape, and the first arc portion 81 formed by this curved shape contacts the first position stopper contact portion 44e. The second tube 20B has a second position stopper contact portion, and a second connecting end position stopper has a second curving portion. The second curving portion has a curved shape, and a second arc portion formed by this curved shape contacts the second position stopper contact portion.

As described above, the first arc portion 81 contacts the first position stopper contact portion 44e by the first curving port ion 78a, and the second arc portion contacts the second position stopper contact portion by the second curving portion. Therefore, as compared with a case where each of the first connecting end position stopper 78 and the second connecting end position stopper has a corner or an edge, damage to the first position stopper contact portion 44e and the second position stopper contact portion due to contact of the first connecting end position stopper 78 and the second connecting end position stopper can be suppressed.

Fifth Embodiment

Figure 18:
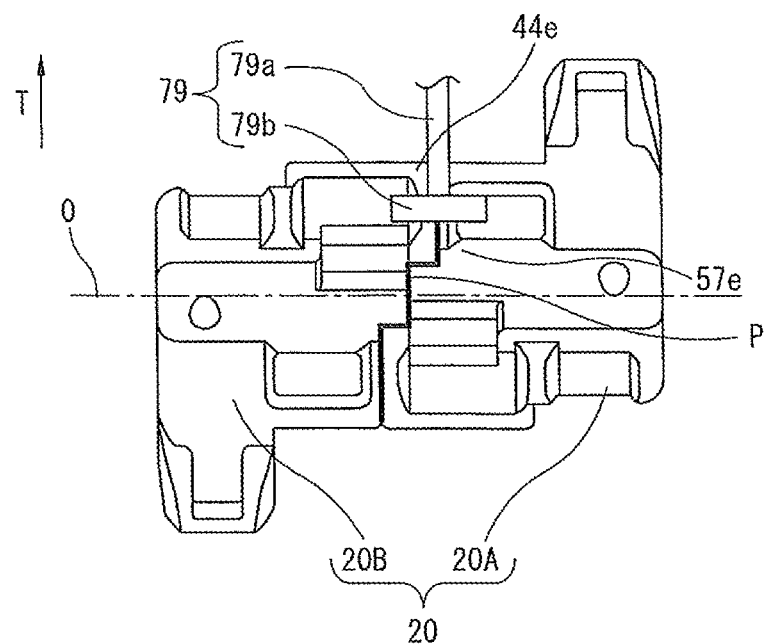
FIG. 18 is a perspective view showing the tube and a first connecting end position stopper according to a fifth embodiment.

FIG. 18 is a perspective view showing the tube 20 and a first connecting end position stopper 79 according to a fifth embodiment.

In the fifth embodiment, the first connecting end position stopper 79 of the clip 22 has a rectangular plate-shaped first base portion 79a and a rectangular plate-shaped first wide stopper portion 79b whose width along the rotation axis O of the nut 17 is greater than that of the first base portion 79a. As shown in FIG. 18, the first base portion 79a and the first wide stopper portion 79b are provided at positions that overlap the boundary P between the first connecting end 46 and the second connecting end 59 and the tangent direction T of the nut 17. The first wide stopper portion 79b is located between the first base portion 79a and the first position stopper contact portion 44e, and contacts both the first position stopper contact portion 44e and the second position stopper contact portion 57e with the first wide stopper portion 79b extending across these first position stopper contact portion 44e and second position stopper contact portion 57e.

[Effect of Fifth Embodiment]

In the fifth embodiment, the first tube 20A has the first position stopper contact portion 44e, and the second tube 20B has the second position stopper contact portion 57e. The connecting end position stopper 74 has the first connecting end position stopper 79 and a second connecting end position stopper. The first connecting end position stopper 79 has the first base portion 79a and the first wide stopper portion 79b. The first base portion 79a has a shape that extends in the circumferential direction of the rotation axis O of the nut 17. The first wide stopper portion 79b is located between the first base portion 79a and the first position stopper contact portion 44e. The width of the first wide stopper portion 79b in the direction of the rotation axis O of the nut 17 is greater than that of the first base portion 79a. The first wide stopper portion 79b is formed into a shape such that the first wide stopper portion 79b can contact the first position stopper contact portion 44e. The second connecting end position stopper has a second base portion and a second wide stopper portion. The second base portion has a shape that extends in the circumferential direction of the rotation axis O of the nut 17. The second wide stopper portion is located between the second base portion and the second position stopper contact portion 57e. The width of the second wide stopper portion in the direction of the rotation axis O of the nut 17 is greater than that of the second base portion. The second wide stopper portion is formed into a shape such that the second wide stopper portion can contact the second position stopper contact portion 57e.

By using these first wide stopper portion 79b and second wide stopper portion, a contact area between the first wide stopper portion 79b and the first position stopper contact portion 44e and a contact area between the second wide stopper portion and the second position stopper contact portion 57e become large. With this, stresses acting on these first and second position stopper contact portions 44e and 57e are dispersed, then internal stress occurring at the first and second tubes 20A and 208 can be lessened.

Sixth Embodiment

Figure 19:
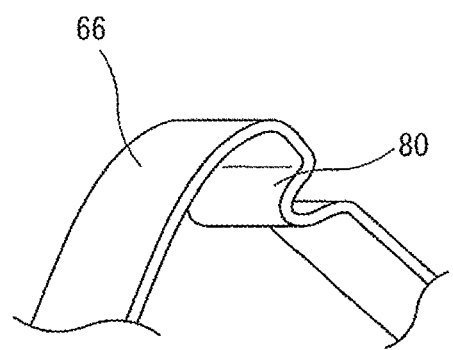
FIG. 19 is an explanatory drawing showing a first inserting part forcing portion according to a sixth embodiment.

FIG. 19 is an explanatory drawing showing a first inserting part forcing portion 66 according to a sixth embodiment.

In the sixth embodiment, a first connecting end position stopper 80 of the clip 22 is formed such that the first connecting end position stopper 80 and the first inserting part forcing portion 66 are located in series. That is, by pressing down a part of the first inserting part forcing portion 66 in an inward direction of the first inserting part forcing portion 66 so that the part of the first inserting part forcing portion 66 protrudes inwards by press working, the first connecting end position stopper 80 having a U-shaped cross section when viewed from the direction of the rotation axis O of the nut 17 is formed at the midpoint of the first inserting part forcing portion 66.

[Effect of Sixth Embodiment]

In the sixth embodiment, the first inserting part forcing portion 66 has a shape that extends in the circumferential direction of the rotation axis O of the nut 17, and a second inserting part forcing portion has a shape that extends in the circumferential direction of the rotation axis O of the nut 17. The connecting end position stopper 74 has the first connecting end position stopper 80 and a second connecting end position stopper. The first connecting end position stopper 80 is provided such that the first connecting end position stopper 80 and the first inserting part forcing portion 66 are located in series. The second connecting end position stopper is provided such that the second connecting end position stopper and the second inserting part forcing portion are located in series.

As described above, by forming the first connecting end position stopper 80 integrally with the first inserting part forcing portion. 66, a structure of the clip 22 can be simplified.

Further, since the connecting end position stopper is not necessary, material of the connecting end position stopper can be reduced. This can reduce a manufacturing cost of the clip 22.

Other Embodiment

In this embodiment, a connecting end position stopper is formed into a shape such that the connecting end position stopper exerts no urging force on the position stopper contact portion with the connecting end position stopper being in contact with the position stopper contact portion. In other words, in a state in which the clip is fixed to the nut with the screws, the connecting end position stopper is not elastically in contact with the position stopper contact portion, but merely contacts the position stopper contact portion.

[Effect of Other Embodiment]

In this embodiment, the first tube has a first position stopper contact portion, and the second tube has a second position stopper contact portion. The connecting end position stopper has the first connecting end position stopper and the second connecting end position stopper. The first connecting end position stopper is formed into a shape such that the first connecting end position stopper exerts no urging force on the first position stopper contact portion with the first connecting end position stopper being in contact with the first position stopper contact portion. The second connecting end position stopper is formed into a shape such that the second connecting end position stopper exerts no urging force on the second position stopper contact portion with the second connecting end position stopper being in contact with the second position stopper contact portion.

Therefore, the urging forces exerted on the first and second position stopper contact portions by the first and second connecting end position stoppers are almost zero. It is thus possible to suppress an occurrence of internal stress at the first and second position stopper contact portions. Especially in a case where the first tube and the second tube are made of synthetic resin material, an occurrence of creep at the first and second position stopper contact portions can be suppressed.

As the power steering device based on the embodiments explained above, for instance, the followings are raised.

As one aspect of the present invention, a power steering device comprises: a steered shaft having a spiral steered shaft-side ball screw groove; a nut having a main body, a nut-side ball screw groove, a first communication passage and a second communication passage, wherein the main body has a cylindrical shape, and the steered shaft is inserted into the main body, the nut-side ball screw groove is a spiral groove formed at an inner peripheral side of the main body, the first communication passage communicates with the inner peripheral side and an outer peripheral side of the main body, and the second communication passage communicates with the inner peripheral side and the outer peripheral side of the main body; a plurality of balls provided movable between the steered shaft-side ball screw groove and the nut-side ball screw groove and supporting the nut such that the nut can rotate relative to the steered shaft; a tubular-shaped first circulation member having a first inserting part, a first bending section, a first connecting section and a first connecting end, wherein the first inserting part is inserted into the first communication passage, the first connecting section is located at an outer peripheral side of the nut, and the first bending section is provided between the first inserting part and the first connecting section; a tubular-shaped second circulation member having a second inserting part, a second bending section, a second connecting section and a second connecting end, wherein the second inserting part is inserted into the second communication passage, the second connecting section is located at the outer peripheral side of the nut, the second bending section is provided between the second inserting part and the second connecting section, and the second connecting end is provided at the second connecting section on an opposite side to the second bending section such that the second connecting end faces the first connecting end of the first connecting section and the plurality of balls are movable between the first circulation member and the second circulation member; a fixing member having a first inserting part forcing portion, a second inserting part forcing portion and a connecting end position stopper, wherein the first inserting part forcing portion forces the first inserting part in a direction in which the first inserting part is inserted into the first communication passage, the second inserting part forcing portion forces the second inserting part in a direction in which the second inserting part is inserted into the second communication passage, and the connecting end position stopper has a shape that stops a relative position shift between the first connecting end and the second connecting end; and an electric motor driving and rotating the nut and moving the steered shaft in an axial direction of the steered shaft by rotation of the nut.

As a preferable power steering device, the connecting end position stopper is located at a position close to the first connecting end rather than the first inserting part forcing portion, and at a position close to the second connecting end rather than the second inserting part forcing portion.

As another preferable power steering device, the first circulation member has a first connecting end contact surface, the first connecting end contact surface is parallel to a direction in which the balls pass through inner sides of the first connecting section and the second connecting section, the second circulation member has a second connecting end contact surface, the second connecting end contact surface is parallel to the first connecting end contact surface and faces the first connecting end contact surface, the connecting end position stopper has a first connecting end position stopper and a second connecting end position stopper, the first connecting end position stopper stops a movement of the first connecting end contact surface in a direction in which the first connecting end contact surface separates from the second connecting end contact surface, and the second connecting end position stopper stops a movement of the second connecting end contact surface in a direction in which the second connecting end contact surface separates from the first connecting end contact surface.

As a far preferable power steering device, the connecting end position stopper has a shape that extends across a boundary between the first connecting end and the second connecting end.

As a far preferable power steering device, the fixing member has a first fixing portion and a second fixing portion, the first fixing portion has a first screw hole into which a first screw for fixing the fixing member to the nut is inserted, the second fixing portion has a circular second screw hole into which a second screw for fixing the fixing member to the nut is inserted, the connecting end position stopper has a first connecting end position stopper and a second connecting end position stopper, the first connecting end position stopper generates an urging force acting on the first connecting section by elastic deformation of the fixing member when the first fixing portion is fixed to the nut with the first screw, and the second connecting end position stopper generates an urging force acting on the second connecting section by elastic deformation of the fixing member when the second fixing portion is fixed to the nut with the second screw.

As a far preferable power steering device, the first circulation member has a first position stopper contact portion, the second circulation member has a second position stopper contact portion, the first position stopper contact portion is a surface perpendicular to a tangent direction of the nut which is tangent to a rotation axis of the nut, and is formed into a shape such that the first connecting end position stopper can contact the first position stopper contact portion, and the second position stopper contact portion is a surface perpendicular to the tangent direction of the nut which is tangent to the rotation axis of the nut, and is formed into a shape such that the second connecting end position stopper can contact the second position stopper contact portion.

As a far preferable power steering device, the first circulation member has a first position stopper contact portion, the first connecting end position stopper has a first curving portion, the first curving portion has a curved shape, and a first arc portion formed by said curved shape contacts the first position stopper contact portion, the second circulation member has a second position stopper contact portion, the second connecting end position stopper has a second curving portion, and the second curving portion has a curved shape, and a second arc portion formed by said curved shape contacts the second position stopper contact portion.

As a far preferable power steering device, the first circulation member has a first position stopper contact portion, the first connecting end position stopper has a first round surface portion, the first round surface portion has a round shape, and contacts the first position stopper contact portion, the second circulation member has a second position stopper contact portion, the second connecting end posit ion stopper has a second round surface portion, and the second round surface portion has a round shape, and contacts the second position stopper contact portion.

As a far preferable power steering device, the first inserting part forcing portion has a shape that extends in a circumferential direction of a rotation axis of the nut, the second inserting part forcing portion has a shape that extends in the circumferential direction of the rotation axis of the nut, the connecting end position stopper has a shape that extends in the circumferential direction of the rotation axis of the nut, and a width of the connecting end position stopper along the direction of the rotation axis of the nut is smaller than each width of the first inserting part forcing portion and the second inserting part forcing portion along the direction of the rotation axis of the nut.

As a far preferable power steering device, the first circulation member has a first position stopper contact portion, the second circulation member has a second position stopper contact portion, the connecting end position stopper has a first connecting end position stopper and a second connecting end position stopper, the first connecting end position stopper has a first base portion and a first wide stopper portion, the first base portion has a shape that extends in a circumferential direction of a rotation axis of the nut, the first wide stopper portion is located between the first base portion and the first position stopper contact portion, a width of the first wide stopper portion in a direction of the rotation axis of the nut is greater than that of the first base portion, the first wide stopper portion is formed into a shape such that the first wide stopper portion can contact the first position stopper contact portion, the second connecting end position stopper has a second base portion and a second wide stopper portion, the second base portion has a shape that extends in the circumferential direction of the rotation axis of the nut, the second wide stopper portion is located between the second base portion and the second position stopper contact portion, a width of the second wide stopper portion in the direction of the rotation axis of the nut is greater than that of the second base portion, and the second wide stopper portion is formed into a shape such that the second wide stopper portion can contact the second position stopper contact portion.

As a far preferable power steering device, the first circulation member has a first position stopper contact portion, the second circulation member has a second position stopper contact portion, the connecting end position stopper has a first connecting end position stopper and a second connecting end position stopper, the first connecting end position stopper is formed into a shape such that the first connecting end posit ion stopper exerts no urging force on the first position stopper contact portion with the first connecting end position stopper being in contact with the first position stopper contact portion, and the second connecting end position stopper is formed into a shape such that the second connecting end position stopper exerts no urging force on the second position stopper contact portion with the second connecting end position stopper being in contact with the second position stopper contact portion.

As a far preferable power steering device, the fixing member is made of spring steel.

As a far preferable power steering device, the first inserting part forcing portion has a shape that extends in a circumferential direction of the rotation axis of the nut, a second inserting part forcing portion has a shape that extends in the circumferential direction of the rotation axis of the nut, the connecting end position stopper has a first connecting end position stopper and a second connecting end position stopper, the first connecting end position stopper is provided such that the first connecting end position stopper and the first inserting part forcing portion are located in series, and the second connecting end position stopper is provided such that the second connecting end position stopper and the second inserting part forcing portion are located in series.

As a far preferable power steering device, the first connecting section and the second connecting section form a ball passage, the first circulation member has a first position stopper contact portion, the second circulation member has a second position stopper contact portion and the connecting end position stopper has a first connecting end position stopper and a second connecting end position stopper. And, in a state in which the first connecting end position stopper contacts the first position stopper contact portion, the ball passage is not located on an extension line of a force exerted on the first position stopper contact portion by the first connecting end position stopper. And, in a state in which the second connecting end position stopper contacts the second position stopper contact portion, the ball passage is not located on an extension line of a force exerted on the second position stopper contact portion by the second connecting end position stopper.

The invention claimed is:

1. A power steering device comprising:
a steered shaft having a spiral steered shaft-side ball screw groove;
a nut having a main body, a nut-side ball screw groove, a first communication passage and a second communication passage, wherein
the main body has a cylindrical shape, and the steered shaft is inserted into the main body,
the nut-side ball screw groove is a spiral groove formed at an inner peripheral side of the main body,
the first communication passage communicates with the inner peripheral side and an outer peripheral side of the main body, and
the second communication passage communicates with the inner peripheral side and the outer peripheral side of the main body;
a plurality of balls provided movable between the steered shaft-side ball screw groove and the nut-side ball screw groove and supporting the nut such that the nut can rotate relative to the steered shaft;
a tubular-shaped first circulation member having a first inserting part, a first bending section, a first connecting section and a first connecting end, wherein
the first inserting part is inserted into the first communication passage,
the first connecting section is located at an outer peripheral side of the nut, and
the first bending section is provided between the first inserting part and the first connecting section;
a tubular-shaped second circulation member having a second inserting part, a second bending section, a second connecting section and a second connecting end, wherein
the second inserting part is inserted into the second communication passage,
the second connecting section is located at the outer peripheral side of the nut,
the second bending section is provided between the second inserting part and the second connecting section, and
the second connecting end is provided at the second connecting section on an opposite side to the second bending section such that the second connecting end faces the first connecting end of the first connecting section and the plurality of balls are movable between the first circulation member and the second circulation member;
a fixing member having a first inserting part forcing portion, a second inserting part forcing portion and a connecting end position stopper, wherein
the first inserting part forcing portion forces the first inserting part in a direction in which the first inserting part is inserted into the first communication passage,
the second inserting part forcing portion forces the second inserting part in a direction in which the second inserting part is inserted into the second communication passage, and
the connecting end position stopper has a shape that stops a relative position shift between the first connecting end and the second connecting end; and
an electric motor driving and rotating the nut and moving the steered shaft in an axial direction of the steered shaft by rotation of the nut.

2. The power steering device as claimed in claim 1, wherein:
the connecting end position stopper is located at a position close to the first connecting end rather than the first inserting part forcing portion, and at a position close to the second connecting end rather than the second inserting part forcing portion.

3. The power steering device as claimed in claim 1, wherein:
the first circulation member has a first connecting end contact surface,
the first connecting end contact surface is parallel to a direction in which the balls pass through inner sides of the first connecting section and the second connecting section,
the second circulation member has a second connecting end contact surface,
the second connecting end contact surface is parallel to the first connecting end contact surface and faces the first connecting end contact surface,
the connecting end position stopper has a first connecting end position stopper and a second connecting end position stopper,
the first connecting end position stopper stops a movement of the first connecting end contact surface in a direction in which the first connecting end contact surface separates from the second connecting end contact surface, and
the second connecting end position stopper stops a movement of the second connecting end contact surface in a direction in which the second connecting end contact surface separates from the first connecting end contact surface.

4. The power steering device as claimed in claim 1, wherein:
the connecting end position stopper has a shape that extends across a boundary between the first connecting end and the second connecting end.

5. The power steering device as claimed in claim 1, wherein:
the fixing member has a first fixing portion and a second fixing portion,
the first fixing portion has a first screw hole into which a first screw for fixing the fixing member to the nut is inserted,
the second fixing portion has a circular second screw hole into which a second screw for fixing the fixing member to the nut is inserted,
the connecting end position stopper has a first connecting end position stopper and a second connecting end position stopper,
the first connecting end position stopper generates an urging force acting on the first connecting section by elastic deformation of the fixing member when the first fixing portion is fixed to the nut with the first screw, and
the second connecting end position stopper generates an urging force acting on the second connecting section by elastic deformation of the fixing member when the second fixing portion is fixed to the nut with the second screw.

6. The power steering device as claimed in claim 5, wherein:
the first circulation member has a first position stopper contact portion,
the second circulation member has a second position stopper contact portion,
the first position stopper contact portion is a surface perpendicular to a tangent direction of the nut which is tangent to a rotation axis of the nut, and is formed into a shape such that the first connecting end position stopper can contact the first position stopper contact portion, and
the second position stopper contact portion is a surface perpendicular to the tangent direct ion of the nut which is tangent to the rotation axis of the nut, and is formed into a shape such that the second connecting end position stopper can contact the second position stopper contact portion.

7. The power steering device as claimed in claim 5, wherein:
the first circulation member has a first position stopper contact portion,
the first connecting end position stopper has a first curving portion,
the first curving portion has a curved shape, and a first arc portion formed by said curved shape contacts the first position stopper contact portion,
the second circulation member has a second position stopper contact portion,
the second connecting end position stopper has a second curving portion, and
the second curving portion has a curved shape, and a second arc portion formed by said curved shape contacts the second position stopper contact portion.

8. The power steering device as claimed in claim 5, wherein:
the first circulation member has a first position stopper contact portion,
the first connecting end position stopper has a first round surface portion,
the first round surface portion has a round shape, and contacts the first position stopper contact portion,
the second circulation member has a second position stopper contact portion,
the second connecting end position stopper has a second round surface portion, and
the second round surface portion has a round shape, and contacts the second position stopper contact portion.

9. The power steering device as claimed in claim 1, wherein:
the first inserting part forcing portion has a shape that extends in a circumferential direction of a rotation axis of the nut,
the second inserting part forcing portion has a shape that extends in the circumferential direction of the rotation axis of the nut,
the connecting end position stopper has a shape that extends in the circumferential direction of the rotation axis of the nut, and
a width of the connecting end position stopper along the direction of the rotation axis of the nut is smaller than each width of the first inserting part forcing portion and the second inserting part forcing portion along the direction of the rotation axis of the nut.

10. The power steering device as claimed in claim 1, wherein:
the first circulation member has a first position stopper contact portion,
the second circulation member has a second position stopper contact portion,
the connecting end position stopper has a first connecting end position stopper and a second connecting end position stopper,
the first connecting end position stopper has a first base portion and a first wide stopper portion, the first base portion has a shape that extends in a circumferential direction of a rotation axis of the nut,
the first wide stopper portion is located between the first base portion and the first position stopper contact portion,
a width of the first wide stopper portion in a direction of the rotation axis of the nut is greater than that of the first base portion,
the first wide stopper portion is formed into a shape such that the first wide stopper portion can contact the first position stopper contact portion,
the second connecting end position stopper has a second base portion and a second wide stopper portion,
the second base portion has a shape that extends in the circumferential direction of the rotation axis of the nut,
the second wide stopper portion is located between the second base portion and the second position stopper contact portion,
a width of the second wide stopper portion in the direction of the rotation axis of the nut is greater than that of the second base portion, and
the second wide stopper portion is formed into a shape such that the second wide stopper portion can contact the second position stopper contact portion.

11. The power steering device as claimed in claim 1, wherein:
the first circulation member has a first position stopper contact portion,
the second circulation member has a second position stopper contact portion,
the connecting end position stopper has a first connecting end position stopper and a second connecting end position stopper,
the first connecting end posit ion stopper is formed into a shape such that the first connecting end position stopper exerts no urging force on the first position stopper contact portion with the first connecting end position stopper being in contact with the first position stopper contact portion, and
the second connecting end position stopper is formed into a shape such that the second connecting end position stopper exerts no urging force on the second position stopper contact portion with the second connecting end position stopper being in contact with the second position stopper contact portion.

12. The power steering device as claimed in claim 1, wherein:
the fixing member is made of spring steel.

13. The power steering device as claimed in claim 1, wherein:
the first inserting part forcing portion has a shape that extends in a circumferential direction of the rotation axis of the nut,
a second inserting part forcing portion has a shape that extends in the circumferential direction of the rotation axis of the nut, the connecting end position stopper has a first connecting end position stopper and a second connecting end position stopper, the first connecting end position stopper is provided such that the first connecting end position stopper and the first inserting part forcing portion are located in series, and the second connecting end position stopper is provided such that the second connecting end position stopper and the second inserting part forcing portion are located in series.

14. The power steering device as claimed in claim 1, wherein:

the first connecting section and the second connecting section form a ball passage, the first circulation member has a first position stopper contact portion, the second circulation member has a second position stopper contact portion, the connecting end position stopper has a first connecting end position stopper and a second connecting end position stopper, in a state in which the first connecting end position stopper contacts the first position stopper contact portion, the ball passage is not located on an extension line of a force exerted on the first position stopper contact portion by the first connecting end position stopper, and in a state in which the second connecting end position stopper contacts the second position stopper contact portion, the ball passage is not located on an extension line of a force exerted on the second position stopper contact portion by the second connecting end position stopper.

* * * * *